(12) United States Patent
Di Simone

(10) Patent No.: US 8,758,002 B2
(45) Date of Patent: Jun. 24, 2014

(54) QUICK-CHANGE MOLDING SYSTEM FOR INJECTION MOLDING

(71) Applicant: Mold-Masters (2007) Limited, Georgetown (CA)

(72) Inventor: John Di Simone, Woodbridge (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 0 days.

(21) Appl. No.: 13/927,441

(22) Filed: Jun. 26, 2013

(65) Prior Publication Data

US 2013/0287879 A1   Oct. 31, 2013

Related U.S. Application Data

(62) Division of application No. 13/206,144, filed on Aug. 9, 2011, now Pat. No. 8,480,391.

(60) Provisional application No. 61/372,298, filed on Aug. 10, 2010.

(51) Int. Cl.
    *B29C 45/33* (2006.01)
(52) U.S. Cl.
    USPC ......... 425/190; 425/192 R; 425/533; 425/572
(58) Field of Classification Search
    USPC ...................... 425/185, 190, 192 R, 533, 572
    See application file for complete search history.

(56) References Cited

U.S. PATENT DOCUMENTS

| | | | |
|---|---|---|---|
| 3,868,202 A * | 2/1975 | Valyi | 425/525 |
| 4,497,624 A | 2/1985 | Brun et al. | |
| 5,114,330 A | 5/1992 | Nielsen | |
| 5,531,588 A | 7/1996 | Brun, Jr. et al. | |
| 5,595,771 A | 1/1997 | Foltuz et al. | |
| 5,731,014 A | 3/1998 | Travaglini | |
| 5,814,261 A * | 9/1998 | Steckling | 264/297.6 |
| 6,120,279 A | 9/2000 | Vovan | |
| 6,206,674 B1 * | 3/2001 | Foltuz et al. | 425/185 |
| 6,450,797 B1 | 9/2002 | Joseph | |
| 6,537,053 B1 | 3/2003 | Watkins | |
| 6,540,499 B2 | 4/2003 | Schneider | |

(Continued)

FOREIGN PATENT DOCUMENTS

| CA | 2 718 019 | 7/2009 |
|---|---|---|
| CA | 2408813 | 3/2011 |

(Continued)

OTHER PUBLICATIONS

"Chinese Office Action", CN Application No. 201110286474.3, Aug. 19, 2013.

(Continued)

*Primary Examiner* — Tim Heitbrink
(74) *Attorney, Agent, or Firm* — Medler Ferro PLLC

(57) ABSTRACT

An injection molding system is disclosed that includes a mold insert set and a shaft locking assembly that releasably attaches the mold insert set to a mold plate of the injection molding system. Each mold insert of the mold insert set defines at least a portion of a mold cavity. The shaft locking assembly is displaceable between a locked position in which the mold insert set is held to the mold plate and an unlocked position in which the mold insert set is removable from the mold plate.

19 Claims, 20 Drawing Sheets

(56) References Cited

U.S. PATENT DOCUMENTS

| | | |
|---|---|---|
| 6,799,962 B2 | 10/2004 | Mai et al. |
| 6,802,704 B2 | 10/2004 | Steil et al. |
| 6,896,505 B2 | 5/2005 | Towery et al. |
| 7,086,848 B2 | 8/2006 | Bischer et al. |
| 7,291,000 B2 | 11/2007 | Ciccone et al. |
| 7,335,007 B2 | 2/2008 | Perez et al. |
| 8,480,391 B2 * | 7/2013 | Lausenhammer et al. .... 425/185 |
| 2004/0076703 A1 | 4/2004 | Saulle |
| 2006/0083809 A1 | 4/2006 | Di Simone |
| 2006/0269649 A1 | 11/2006 | Ciccone |
| 2006/0290034 A1 | 12/2006 | Sideris |
| 2007/0154589 A1 | 7/2007 | Fields |
| 2008/0265467 A1 | 10/2008 | McCready et al. |
| 2008/0286403 A1 | 11/2008 | Fisch et al. |
| 2008/0290561 A1 | 11/2008 | Gaiser |
| 2009/0011070 A1 | 1/2009 | Li et al. |
| 2011/0062629 A1 | 3/2011 | Gaiser |
| 2011/0115117 A1 | 5/2011 | Desmith et al. |

FOREIGN PATENT DOCUMENTS

| | | |
|---|---|---|
| EP | 2433777 B1 | 4/2013 |
| JP | 56135826 U1 | 3/1955 |
| WO | 9846410 | 10/1998 |
| WO | 2006/039775 A1 | 4/2006 |
| WO | 2008/138092 | 11/2008 |
| WO | 2010/017622 | 2/2010 |

OTHER PUBLICATIONS

"EP Search Report", EP Application No. 11 176 808.1, Dec. 17, 2013.

* cited by examiner

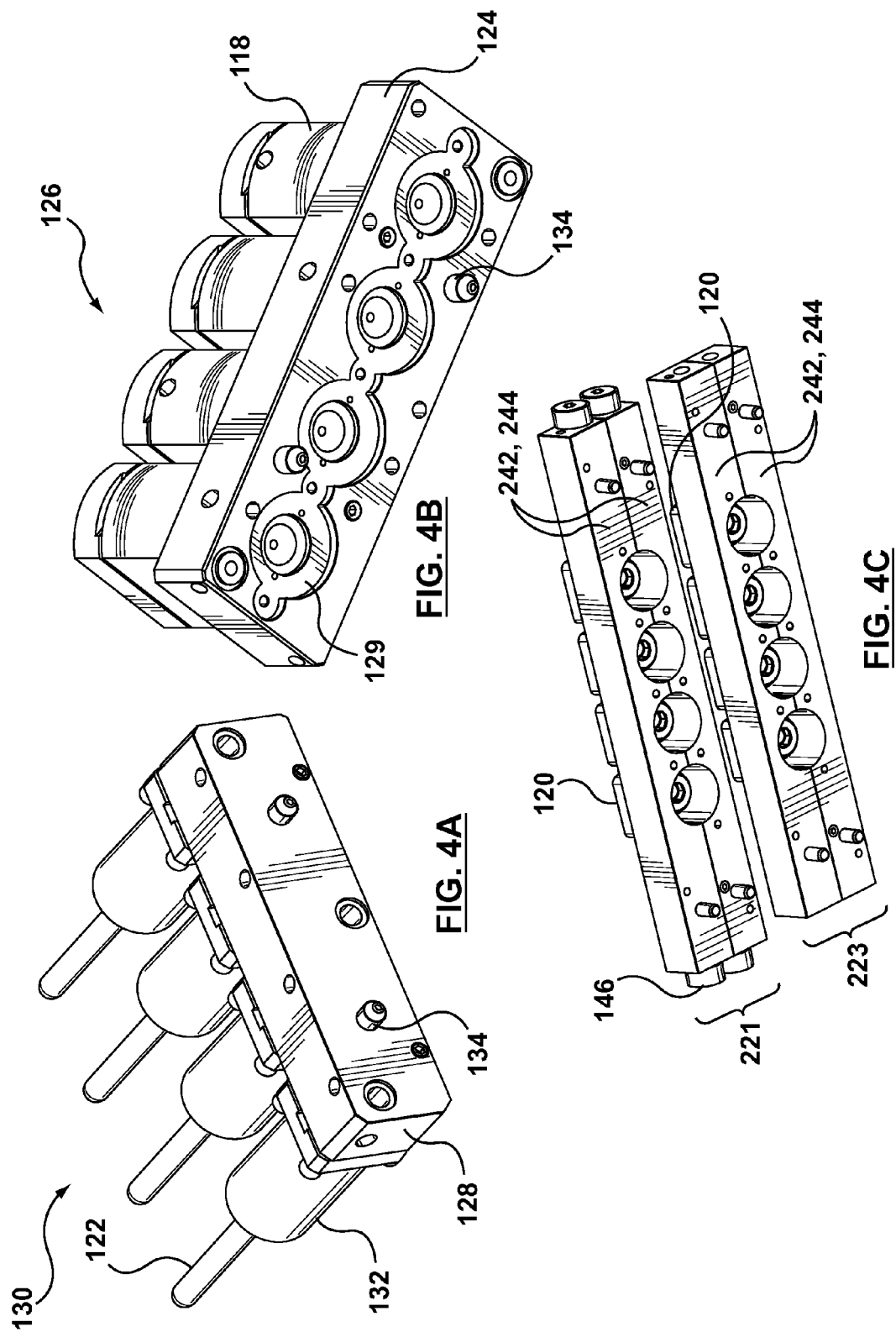

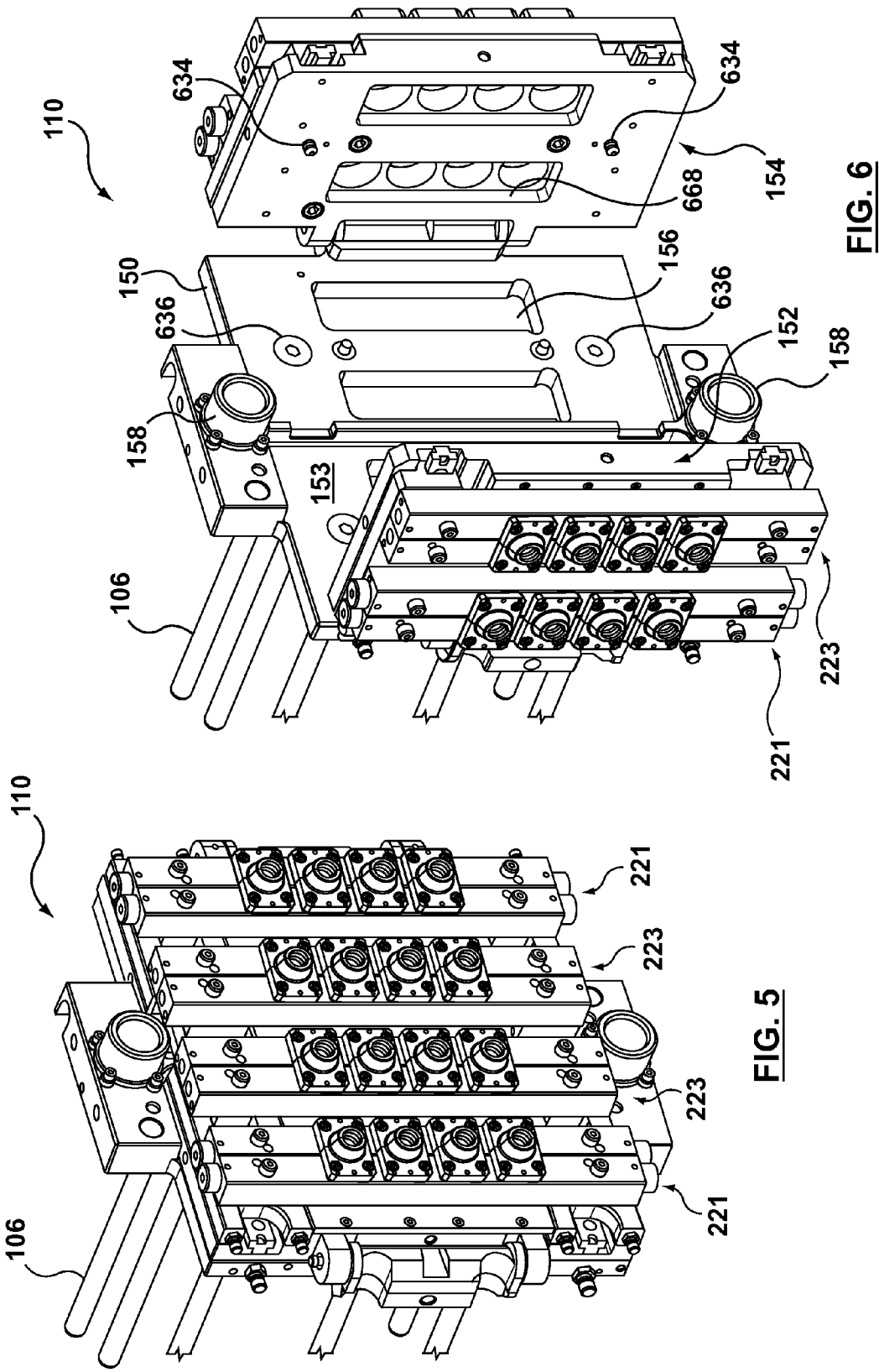

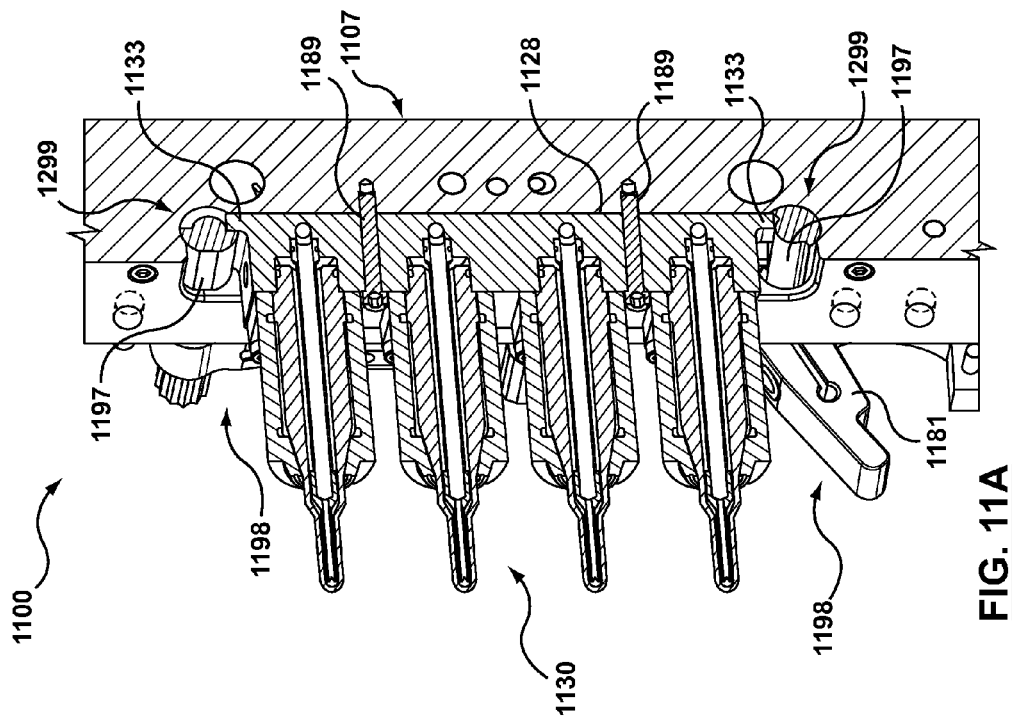
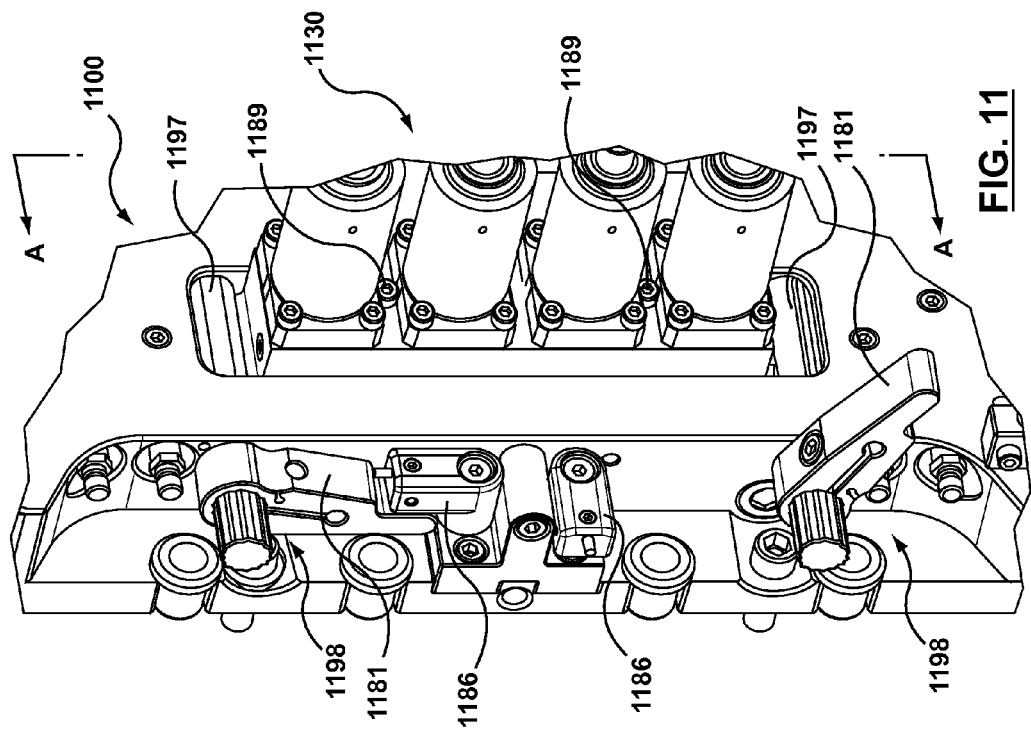

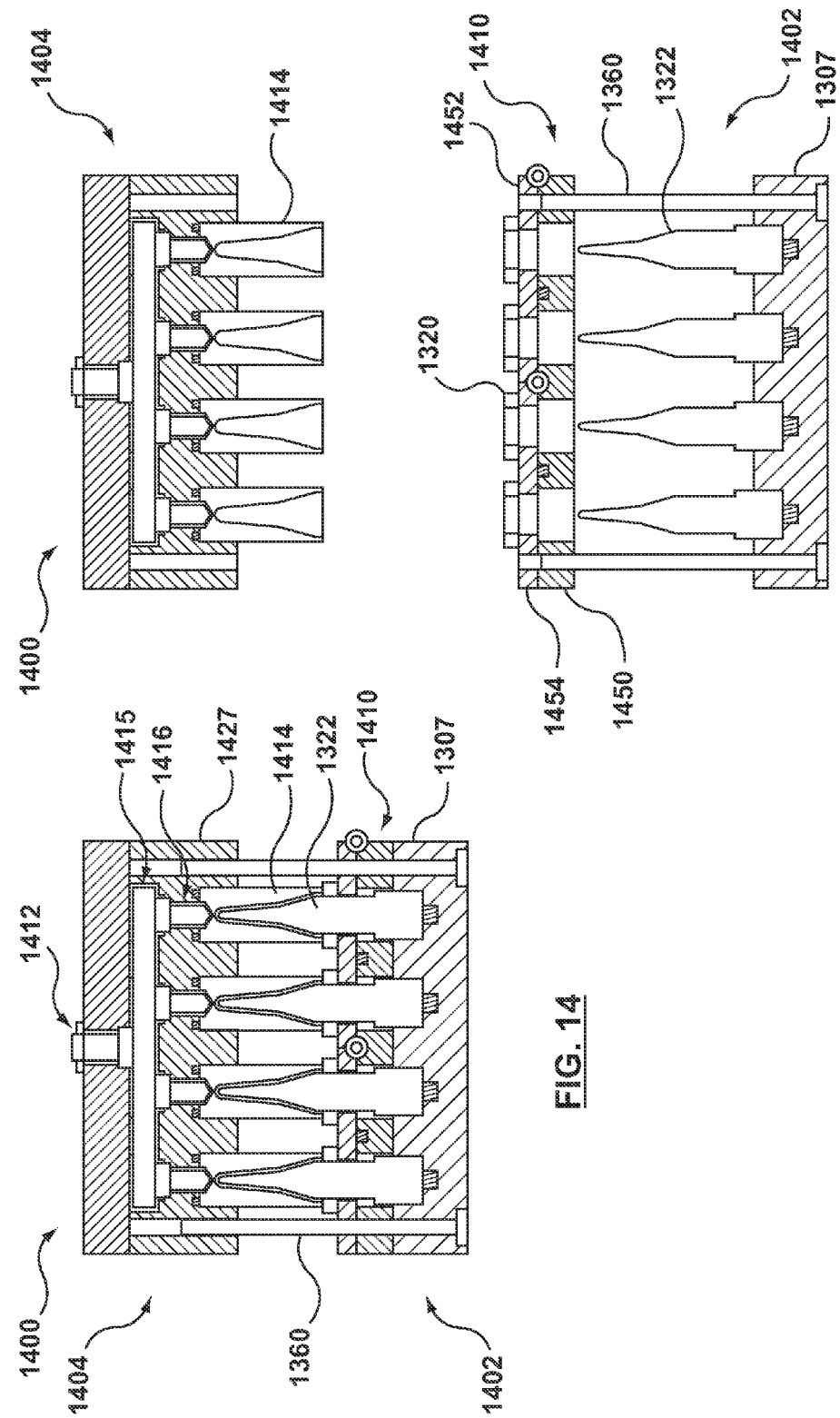

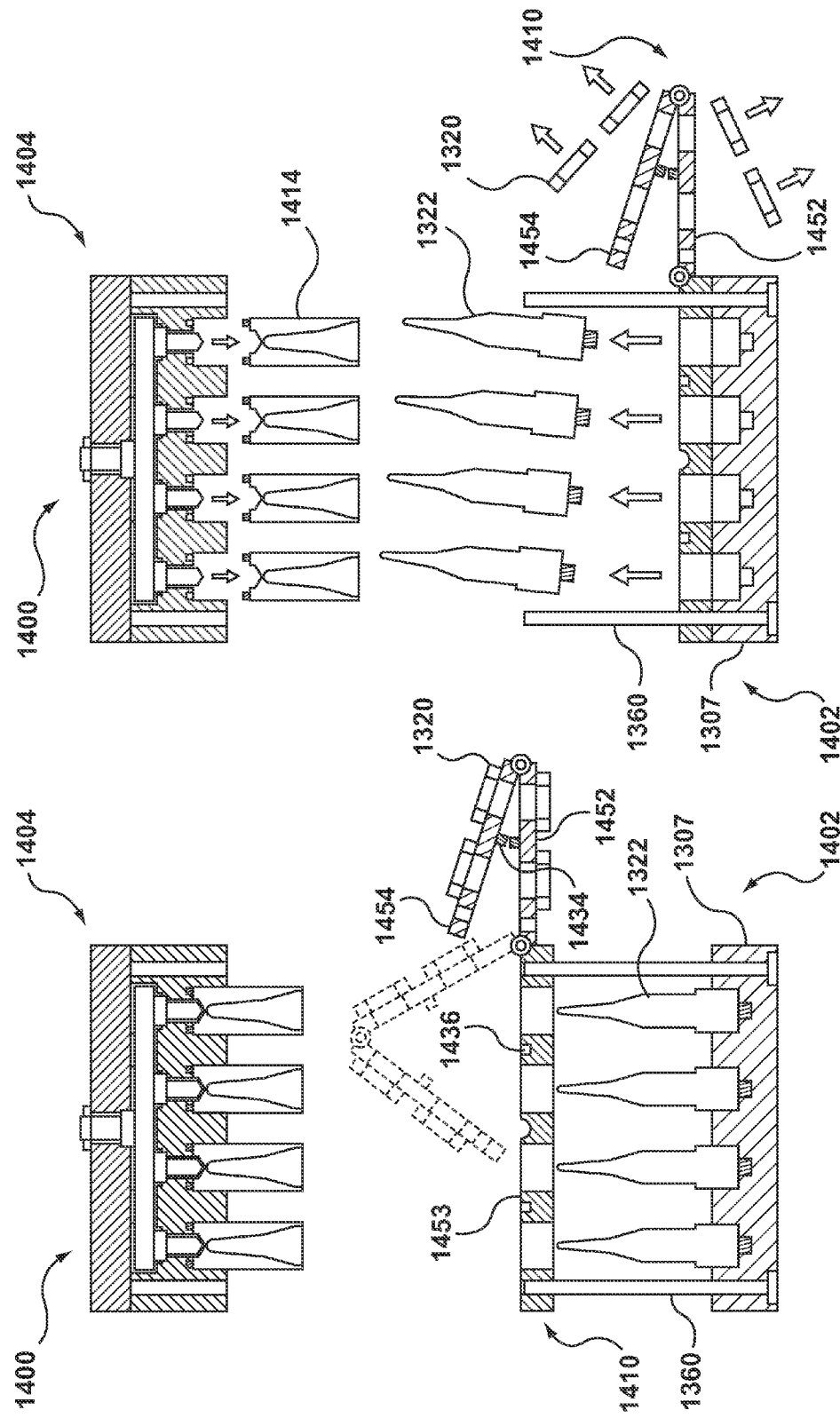

QUICK-CHANGE MOLDING SYSTEM FOR INJECTION MOLDING

CROSS-REFERENCE TO RELATED APPLICATION

This application is a divisional of Ser. No. 13/206,144 filed Aug. 9, 2011, now U.S. Pat. No. 8,480,391, which claims the benefit of U.S. application Ser. No. 61/372,298 filed Aug. 10, 2010, each of which is incorporated by reference herein in its entirety.

FIELD OF THE INVENTION

The invention relates to injection molding machines and in particular to a system for quickly changing components of the mold

BACKGROUND OF THE INVENTION

Conventional injection molding machines include a plastics material plasticizing and injection unit. The plasticizing-injection unit is intended to take particulate plastics material and subject it to mechanical working and thermal conditioning to such a point that it can flow under an applied pressure into a mold to form a desired article. The mold typically includes a pair of mold halves commonly referred to as the male and female mold parts and also commonly referred to as the mold core and mold cavity portions, respectively. The mold halves are usually mounted to a pair of molding machine platens, with the mold cavity portion typically being attached to a stationary platen and the mold core portion typically being attached to a movable platen.

In a conventional hot runner system, a heated manifold is situated in the mold side attached to the stationary platen to receive the melt stream of moldable material from a machine nozzle of the injection molding machine through a sprue bushing. The manifold is connected to a plurality of heated nozzles, each of which is connected to a respective mold cavity. The sprue bushing, manifold, nozzles, mold cavity and mold core are typically spaced between the stationary and movable platens by a plurality of mold plates such as one or more core plates, cavity plates, manifold plates, clamping plates, back plates, etc. that are clamped together when the injection molding machine is closed during an injection cycle.

A typical mold change involves the removal of the complete mold including various mold plates from the injection mold machine in a manner which requires the disconnecting of water hoses, airlines, and electrical connectors necessary for proper operation of the machine. In such systems, before disconnecting all these services, the mold must be drained of water and the hot-runner switched off. The mold is typically then unclamped and hoisted out of the injection molding machine, typically with an overhead crane. When installing a new mold in the injection molding machine, in a known manner all the above-mentioned services must be reconnected. The process of reconnection is quite time consuming and messy due to the necessity of disconnecting water hoses. Safety is also a concern during reconnection as mold technicians may need to climb on top of the mold to access the water and electrical connections. Furthermore, since all services are disconnected and reconnected, valuable time is lost waiting for the mold and machine to heat up again once the new mold is installed. In certain circumstances when changing molds in such a manner, the service hoses typically have to be fully removed as different molds have different sizes and quantities of connectors.

It is known to provide systems that attempt to achieve the quick and efficient changing of mold machine components. However, a need still exists in the art for a quick change mold for an injection molding system that solves one or more of the problems noted above.

BRIEF SUMMARY OF THE INVENTION

Embodiments hereof are directed to an injection molding system that includes a mold insert set and a shaft locking assembly that releasably attaches the mold insert set to a mold plate of the injection molding system. Each mold insert of the mold insert set defines at least a portion of a mold cavity. The shaft locking assembly is displaceable between a locked position in which the mold insert set is held to the mold plate and an unlocked position in which the mold insert set is removable from the mold plate.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 3A-3C and 4A-4C are upstream and downstream perspective views of a core block assembly, a cavity block assembly and split thread-slide assemblies that together form the mold cavities of the molding system of FIG. 1.

FIG. 5 is an upstream perspective view of a stripper plate assembly in accordance with an embodiment hereof removed from a mold core side of the molding system of FIG. 1 in a closed or operational position.

FIG. 6 illustrates the stripper plate assembly shown in FIG. 5 with the stripper plate panels in an open or removal/installation position.

FIG. 11 is perspective view of a portion of a molding system that includes a cam shaft locking assembly in accordance with another embodiment hereof.

FIG. 11A is a sectional view of the molding system of FIG. 11 taken along line A-A.

FIG. 14 is a top sectional view of a quick-change molding system in accordance with another embodiment hereof in a mold closed configuration.

FIGS. 14A-14C illustrate a sequence for changing-out portions of the quick-change molding system shown in FIG. 14.

DETAILED DESCRIPTION OF THE INVENTION

Specific embodiments of the present invention are now described with reference to the figures, wherein like reference numbers indicate identical or functionally similar elements. The first digit of a reference number designates in which figure it first appears. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. "Top", "bottom", "upper", "lower", "left", "right", "inwardly" and "outwardly" are given their customary meaning and are used with reference to a position of the mold system when properly installed in the injection molding machine as viewed from the operator side. Further, "forward" is a position or direction moving toward a parting line $P_L$ of the molding system and "rearward" or "backward" is a position or direction moving away from the parting ling $P_L$ of the molding system. The following detailed description is merely exemplary in nature and is not intended to limit the invention or the application and uses of the invention. Although the description of embodiments hereof is in the context of a molding system for forming preforms, the invention may also be used in other molding applications where it is deemed useful. Furthermore, there is no intention to be bound by any expressed or implied theory presented in the preceding technical field, background, brief summary or the following detailed description.

Figure 1:
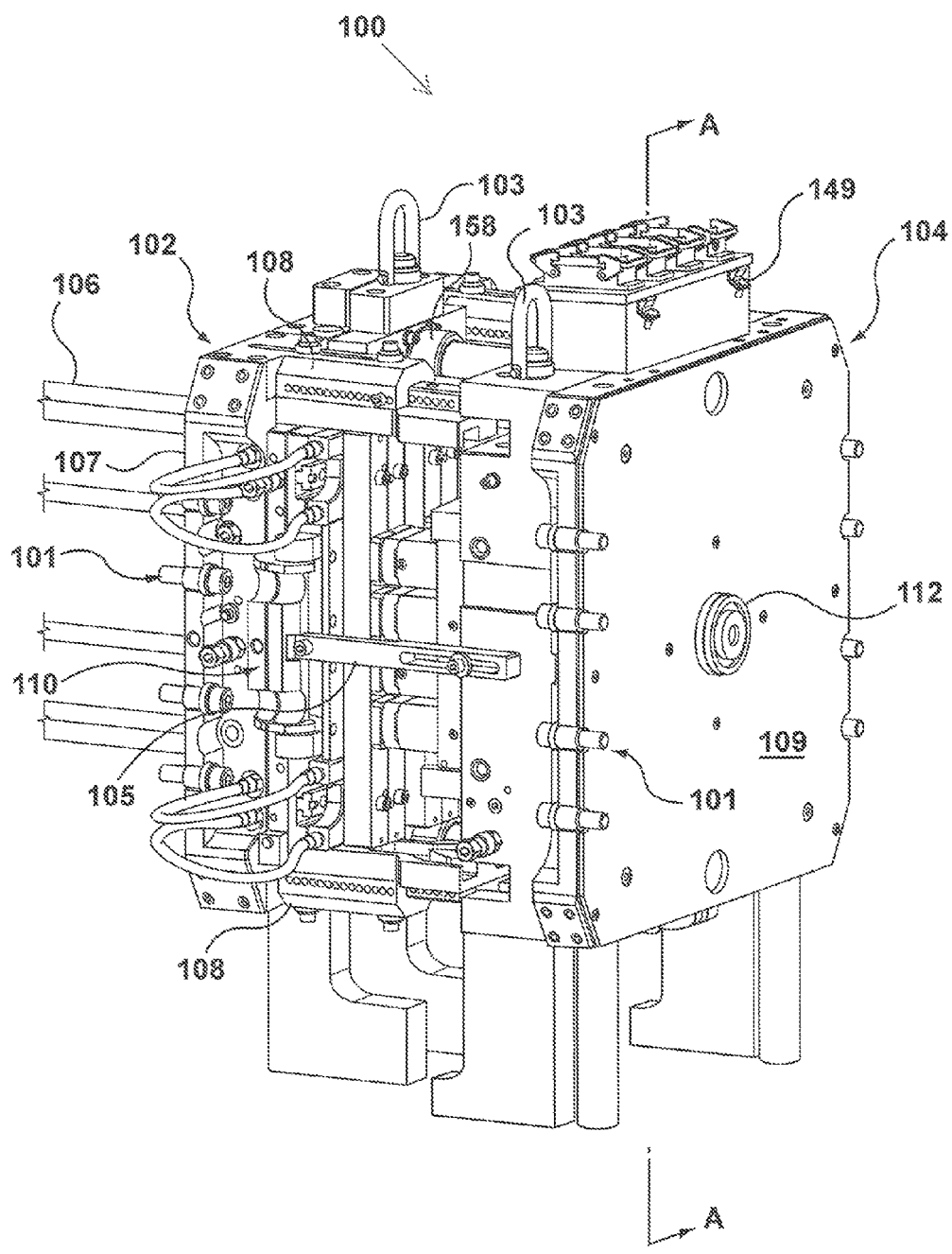
FIG. 1 is a perspective view of a quick-change molding system in accordance with an embodiment hereof in a mold closed configuration.
Figure 1A:
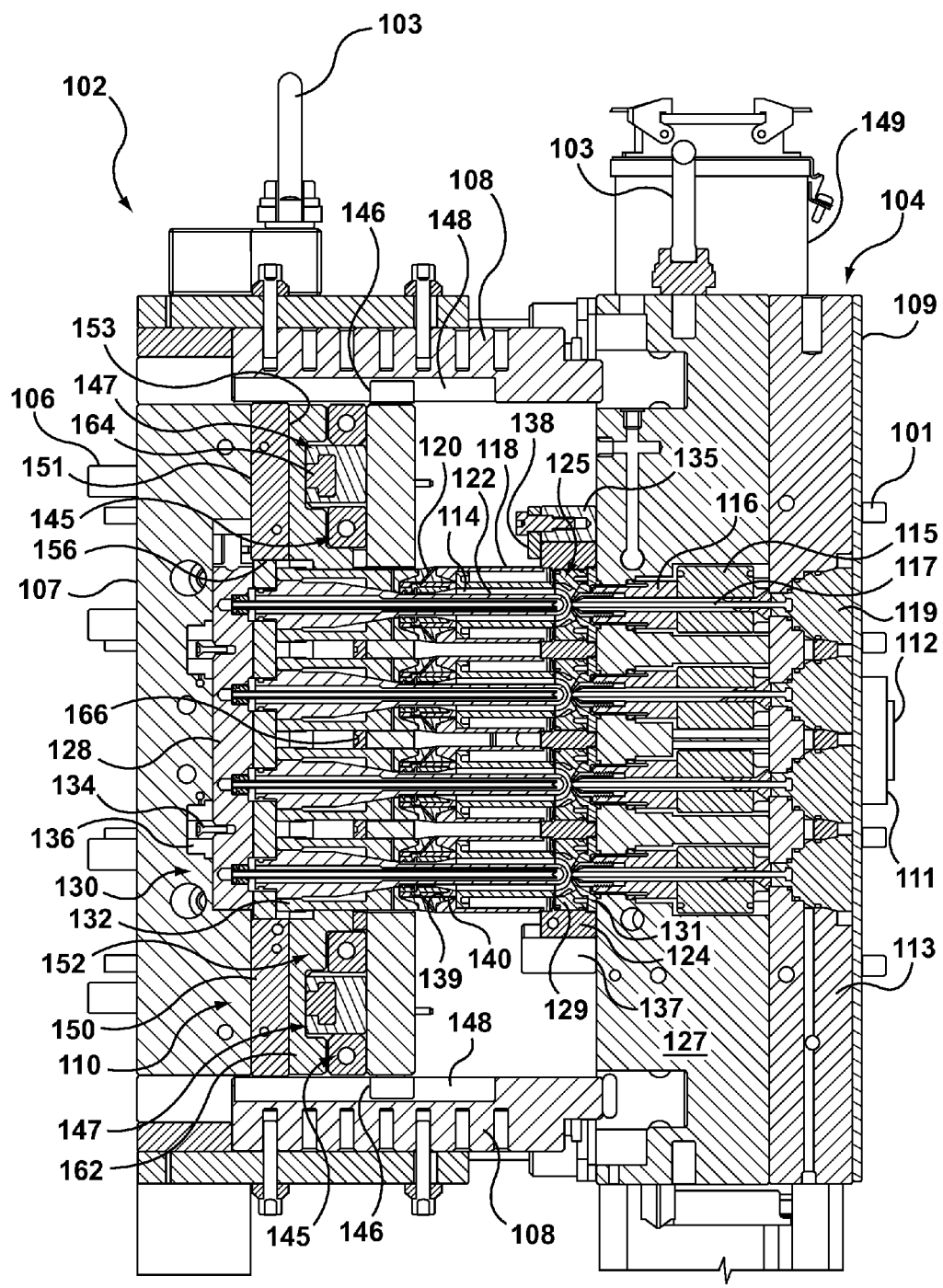
FIG. 1A is a sectional view of the molding system of FIG. 1 taken along line A-A.
Figure 2:
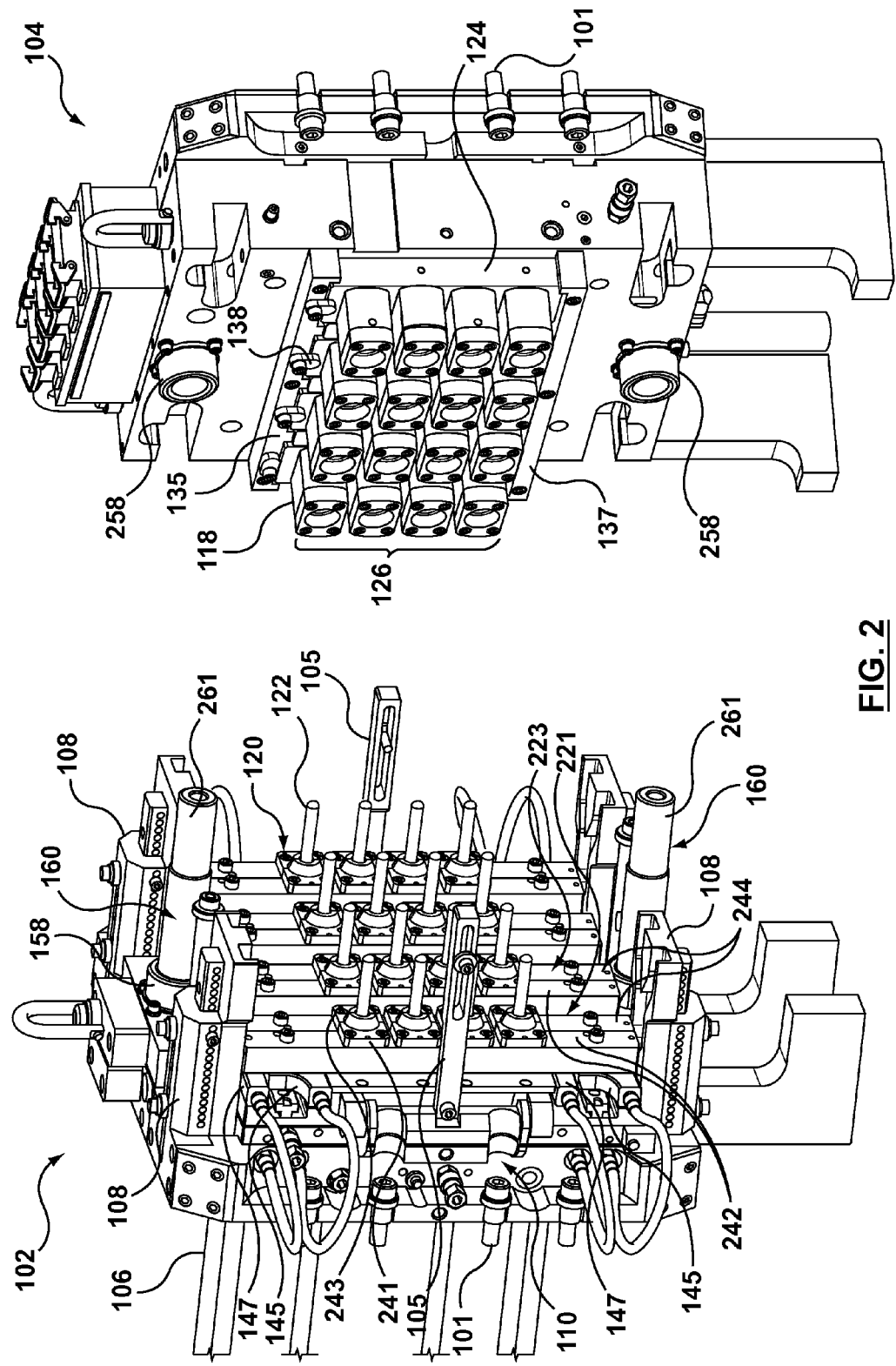
FIG. 2 is a perspective view of the molding system of FIG. 1 in a mold opened configuration.
Figure 3A:
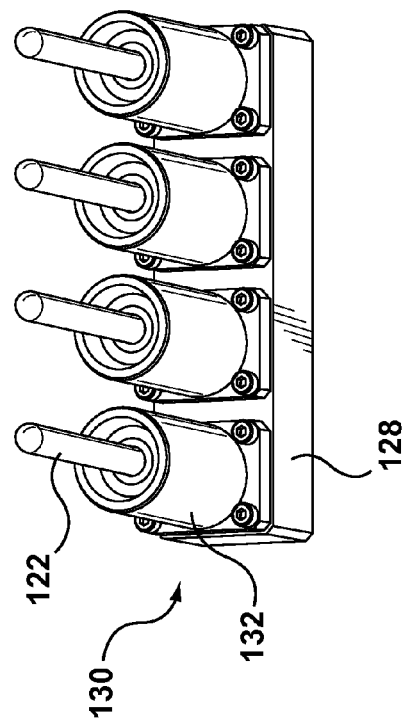
Figure 3B:
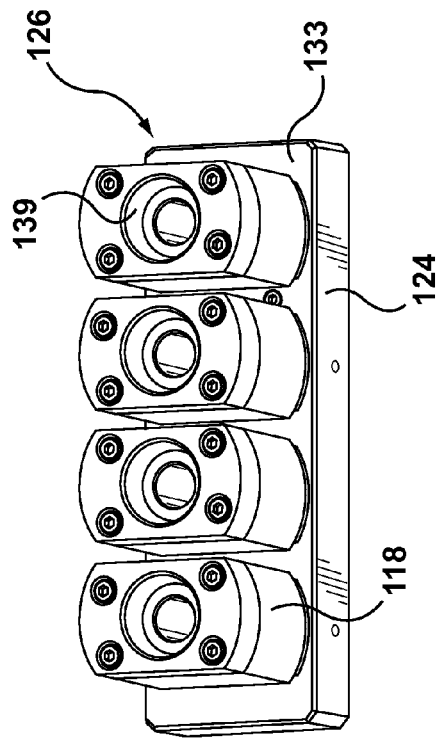
Figure 3C:
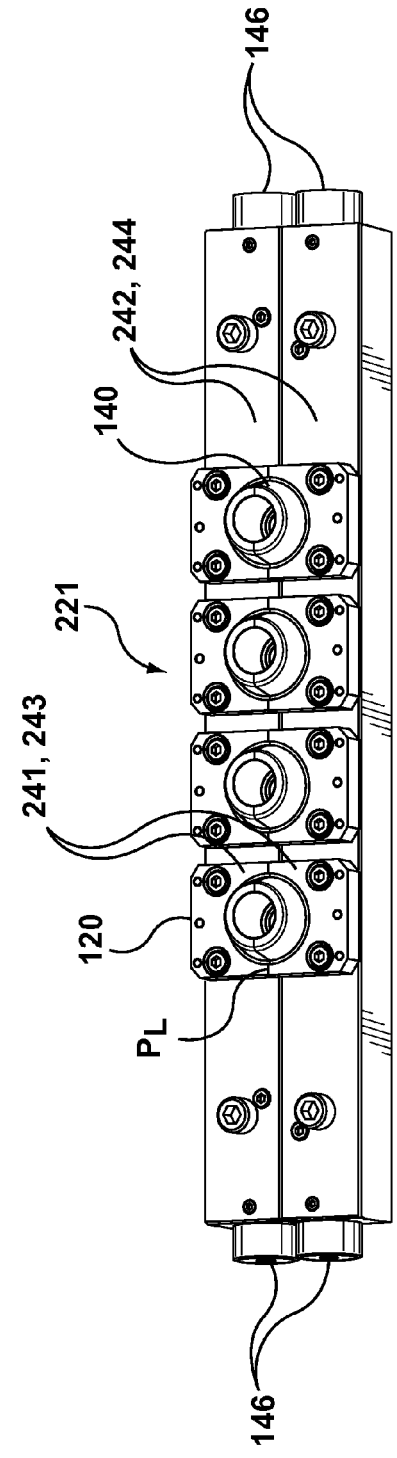

FIGS. 1 and 2 are perspective views of a quick-change molding system 100 in accordance with an embodiment hereof in a mold closed and mold opened configuration, respectively, with FIG. 1A being a sectional view of molding system 100 taken along line A-A in FIG. 1. Molding system 100 includes a mold core side or half 102 that is attachable to a moving platen of an injection molding machine (not shown) and a mold cavity side or half 104 that is attachable to a stationary platen of the injection molding machine (not shown). In the embodiment of FIG. 1, a plurality of bolts 101 are used to secure mold core side 102 and mold cavity side 104 to the movable and stationary platens, respectively. In the mold closed position shown in FIG. 1, a pair of safety latches 105 aid in holding the mold halves together during storage, transportation to and installation into the injection molding machine. More particularly, each end of a respective latch 105 is secured to one of mold core side 102 and mold cavity side 104 by a threaded fastener, such as a socket head cap screw. For ease of installation into the injection molding machine, molding system 100 also includes one or more hoist rings 103 attached to the top of each of mold core side 102 and mold cavity side 104 for use with an overhead crane or like device.

Mold core side 102 includes a plurality of knockout rods 106 extending through and rearward of a core or clamping plate 107 that are operatively connected between a stripper plate assembly 110 and a push-pull type actuation mechanism of the injection molding system (not shown). Mold core side 102 also includes four cam adjustment assembly 108 attached proximate the upper and lower corners thereof to extend forward from mold core side 102 toward mold cavity side 104. In a mold closed position, a forward portion of cam adjustment assembly 108 may fit within a corresponding recess in mold cavity side 104 depending on the overall length of cam adjustment assembly 108. More detailed descriptions of the structure and operation of knockout rods 106, cam adjustment assembly 108 and stripper plate assembly 110 are provided below.

Extending through and forward of an insulator plate 109 of mold cavity side 104 is a melt inlet component 112 for receiving a melt stream of moldable material from an injection nozzle of the injection molding machine (not shown). In an embodiment, melt inlet component 112 is a heated sprue bushing with a locating ring 111 for aligning with the injection nozzle. With reference to FIG. 1A, the melt stream is then conveyed within mold cavity side 104 to a respective mold cavity 114 via a hot runner manifold 115, a hot runner nozzle 116 and a gate insert 125. Manifold 115 and nozzles 116 are positioned within a manifold plate 127. Actuatable valve pins 117 are shown extending through nozzles 116 with a tip portion seated in a mold gate of gate insert 125 and with an upstream end portion coupled to a respective actuation mechanism 119 held within an actuation plate 113 in a manner as would be known to one of ordinary skill in the art. As is conventional, each nozzle 116 may also include, inter alia, a nozzle body, a nozzle heater, a thermocouple, a nozzle tip, and other components as would be known to one of ordinary skill in the art. In FIG. 1A, nozzles 116 in combination with manifold 115 and melt inlet component 112 may be referred to as the hot runner system of molding system 100. Although molding system 100 is depicted as having a valve gated hot runner system, this is by way of example and not limitation. An electrical box 149 for operation of the hot runner system is located on top of mold cavity side 104 and is connected to the components of the hot runner system such that the components are controllable by a hot runner controller (not shown) as would be known to one of ordinary skill in the art.

In the present embodiment mold cavities 114 are shaped to mold preforms and each mold cavity 114 is formed between the mold surfaces of various mold components. More particularly in the present embodiment, mold cavity 114 is formed between the mold surfaces of a respective cavity portion or cavity insert 118, a two-part gate insert 125 and split thread component 120 and the mold surface of a corresponding core portion or core insert 122. In the embodiment shown in FIGS. 1, 1A and 2, molding system 100 is configured for a sixteen cavity mold such that molding system 100 produces sixteen molded articles or preforms per injection cycle. In an alternative embodiment (not shown) molding system 100 is configured to produce more or fewer molded articles per injection cycle.

As shown most clearly in FIGS. 3A-3C and FIGS. 4A-4C, a group or set of four core inserts 122 and corresponding core supports 132 are attached to a core block 128 to form a core block assembly 130, a group or set of four cavity inserts 118 are attached to a cavity block 124 to form a cavity block assembly 126, and a group or set of four pairs of split thread components 120 are attached to a pair of slides 242, 244 to form one or the other of a split thread-slide assembly 221, 223. In another embodiment, a group or set of core inserts, cavity inserts, and corresponding pairs of split thread components may include more or less than four items.

With reference to core block assembly 130, core block 128 is substantially rectangular with core inserts 122 and core supports 132 secured to extend from an upstream surface thereof by flange portions of core support 132. Each core insert 122 is generally cylindrical to provide a molding surface of mold cavity 114 that defines an interior surface of the molded article as would be understood by one of ordinary skill in the art. Core inserts 122 include internal core cooling channels that are open at a downstream end thereof to be in fluid communication with cooling channels (not shown) in core block 128 and core plate 107. A cooling fluid circulated through the cooling channels maintains core inserts 122 at an appropriate temperature to solidify the melt stream of moldable material within mold cavities 114. Protruding from a downstream surface of core block 128 are two pull studs 134, each of which may be detachably coupled to a corresponding clamping device 136 situated within core plate 107 for securing core block assembly 130 to core plate 107. A suitable clamping device for use in embodiments hereof is manufactured and sold by Andreas Maier GmbH & Co. KG of Fellbach, Germany. Briefly, each clamping device 136 produces a holding force via a spring assembly (not shown). Hydraulic pressure is applied to temporarily relieve the pressure provided by the spring assembly and effectively deactivate clamping device 136 to allow acceptance or release of pull studs 134 of core block assembly 130, so that core block assembly 130 may be manually installed on or uninstalled from core plate 107 relatively quickly. Once hydraulic pressure is removed, the spring assembly restores the full holding force of clamping device 136 to secure core block assembly 130 to core plate 107 when installed. Installation of core block assemblies 130 onto mold core side 102 is described in more detail below with reference to FIGS. 5-8.

With reference to cavity block assembly 126, cavity block 124 is substantially rectangular with cavity inserts 118 secured to extend from a downstream surface thereof. Cavity block 124 has a length that is sized to define flange portions 133 that extend beyond either end cavity insert 118. Each cavity insert 118 has a generally cuboid exterior shape and provides a molding surface of mold cavity 114 that defines an exterior surface of a cylindrical body portion of the molded article as would be understood by one of ordinary skill in the art. The use of the term "cylindrical" is approximate, since one of ordinary skill in the art would understand that an amount of draft is necessary in order to remove the molded article from molding system 100. A downstream end of each cavity insert 118 includes a substantially frusto-conical recess 139 for receiving a corresponding tapered portion 140 of a respective split thread component 120 when molding system 100 is in the mold closed configuration.

As shown in FIGS. 1A and 4B, a first gate insert part 129 is secured within an upstream surface of cavity block 124 to mate with a corresponding second gate insert part 131, which is attached to manifold plate 127, when cavity block assembly 126 is mounted to manifold plate 127. Protruding from an upstream surface of cavity block 124 are two pull studs 134, each of which may be detachably coupled to a corresponding clamping device (not shown) situated within manifold plate 127 for securing cavity block assembly 126 to manifold plate 127. When being installed on mold cavity side 104, flange portions 133 of cavity block assembly 126 are slid into or onto corresponding top and bottom rails or tracks 135, 137 and a latch 138 attached to top rail 135 is rotated to engage a top flange portion 133 primarily to hold cavity block assembly 126 in place until the clamping device (not shown) are active. In embodiments hereof, the top and/or bottom rails 135, 137 may include slots that correspond to a shape of flange portion 133 into which cavity block assemblies 126 are inserted during installation.

With reference to split thread-slide assemblies 221, 223, each split thread component 120 includes a left split thread 241 attached to left slide 242 and a right split thread 243 attached to right slide 244, where "left" and "right" are used with reference to a position of the mold when properly installed in the injection molding machine as viewed from the operator side. Left split thread 241 and right split thread 243 meet along a parting line $P_L$ and together provide a molding surface of mold cavity 114 that defines a taper and thread region of the preform as would be understood by one of ordinary skill in the art. In addition to defining the taper and thread region of the preform, left and right split thread inserts 241, 243 together act as a molded article stripper for releasing and ejecting the newly molded article or preform from molding system 100. Split thread-slide assembly 221 includes cam followers 146 attached at each end of left and right slides 242, 244 thereof that ride along a bearing surface 148 of cam adjustment assembly 108, as described in more detail below. To translate lateral motion to left and right slides 242, 244 of split thread-slide assembly 223, left slides 242 of split thread-slide assemblies 221, 223 are attached to move in tandem by a set of first connecting bars 145 and right slides 244 of split thread-slide assemblies 221, 223 are attached to move in tandem by a set of second connecting bars 147. First and second connecting bars 145, 147 are shown more clearly in an exploded view of a portion of stripper plate assembly 110 depicted in FIG. 8. Briefly, during ejection of the newly molded preforms, once the preforms are released from mold core inserts 122 as stripper plate assembly 110 is forwardly actuated toward an ejection position, left and right slides 242, 244 of split thread-slide assembly 221, 223 are laterally translated by cam followers 146 of first connecting bars 145 riding along bearing surfaces 148 of respective cam adjustment assemblies 108. Concurrently, left and right slides 242, 244 laterally retract the respective left and right split thread inserts 241, 243 of split thread-slide assembly 221, 223 away from the threaded portion of the preforms permitting ejection thereof.

Figure 7:
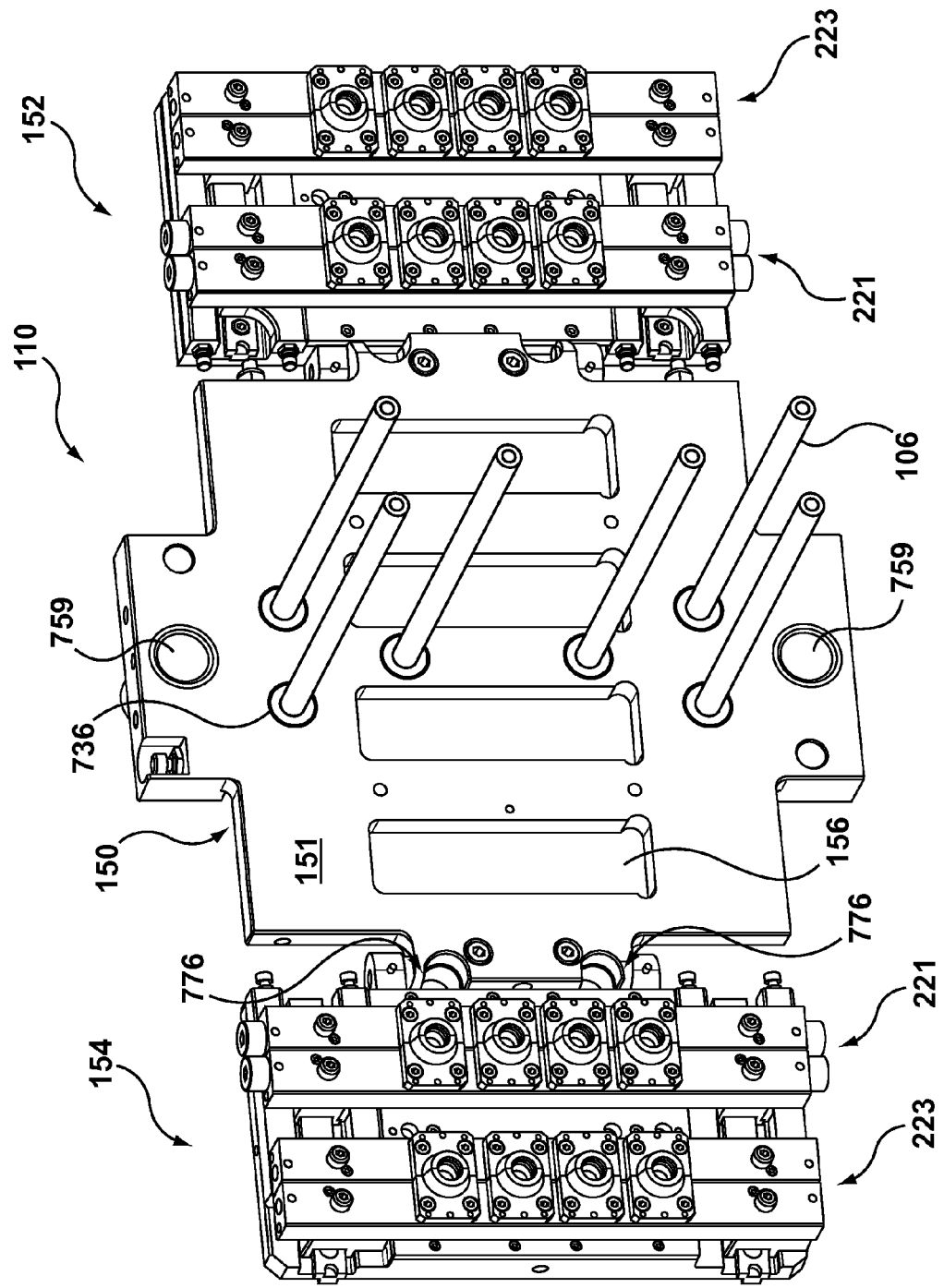
FIG. 7 is a downstream perspective view of the stripper plate assembly shown in FIG. 5 with the stripper plate panels in an open or removal/installation position.

FIG. 5 depicts an upstream perspective view of stripper plate assembly 110 removed from mold core side 102 of molding system 100 shown in FIGS. 1, 1A and 2, in a closed or operational position. FIG. 6 depicts the same view of stripper plate assembly 110 with left and right stripper plate panels 152, 154 outwardly moved or swung into an open or removal/installation position, and FIG. 7 depicts a downstream perspective view of stripper plate assembly 110 with left and right stripper plate panels 152, 154 outwardly moved or swung into a wider open or removal/installation position. Stripper plate assembly 110 includes a main stripper plate 150 having a downstream face 151 that sits against core plate 107 and in which upstream ends of knock-out bars 106 are releasably secured within respective clamping devices 736, the structure and general operation of which is described above with reference to clamping device 136. In another embodiment, knock-out bars 106 may be releasably attached to main stripper plate 150 via a threaded connection. The attachment mechanisms noted above for securing knock-out bars 106 to stripper plate assembly 110 permit knock-out bars 106 to be quickly removed therefrom so that stripper plate assembly 110 may be quickly and easily transferred from mold core side 102 to mold cavity side 104 during maintenance, as would be understood by one of ordinary skill in the art.

Main stripper plate 150 includes four substantially rectangular openings 156 through which core block assemblies 130 extend to be coupled to core plate 107. An upstream face 153 of main stripper plate 150 includes a plurality of clamping devices 636 positioned therein for mating with corresponding pull studs 634 that extend from downstream faces of left and right stripper plate panels 152, 154. When left and right stripper plate panels 152, 154 are in an operating position as shown in FIG. 5, clamping devices 636 hold a respective pull stud 634 therein in a manner as described above with reference to clamping device 136 to thereby prevent panels 152, 154 from opening during operation.

Guide or leader pin bushings 158 are attached to main stripper plate 150 to align with guide or leader pin bores 759 therein and are mounted to forwardly extend toward mold cavity side 104. With reference to FIGS. 1 and 2, guide or leader pins 160 are attached to and forwardly extend from core plate 107 to be slidably receivable within a respective guide bore 759 and guide bushing 158 of stripper plate assembly 110. During ejection of the molded articles or installation of split thread-slide assemblies 221, as described further below, knock-out bars 106 are operably connected to translate stripper plate assembly 110 away from core plate 107 along leader pins 160. In order to accommodate the installation position of stripper plate assembly 110 shown in FIG. 6 when molding system 100 is in an open configuration, leader pins 160 must have a suitable length, with or without extensions, to provide full support to stripper plate assembly 110. A reduced diameter upstream segment 261 of each leader pin 160 is slidably receivable within guide bushings 258 that are mounted to mold cavity side 104 to aid in aligning mold core side 102 with mold cavity side 104 when molding system 100 is in the mold closed configuration shown in FIG. 1.

Figure 8:
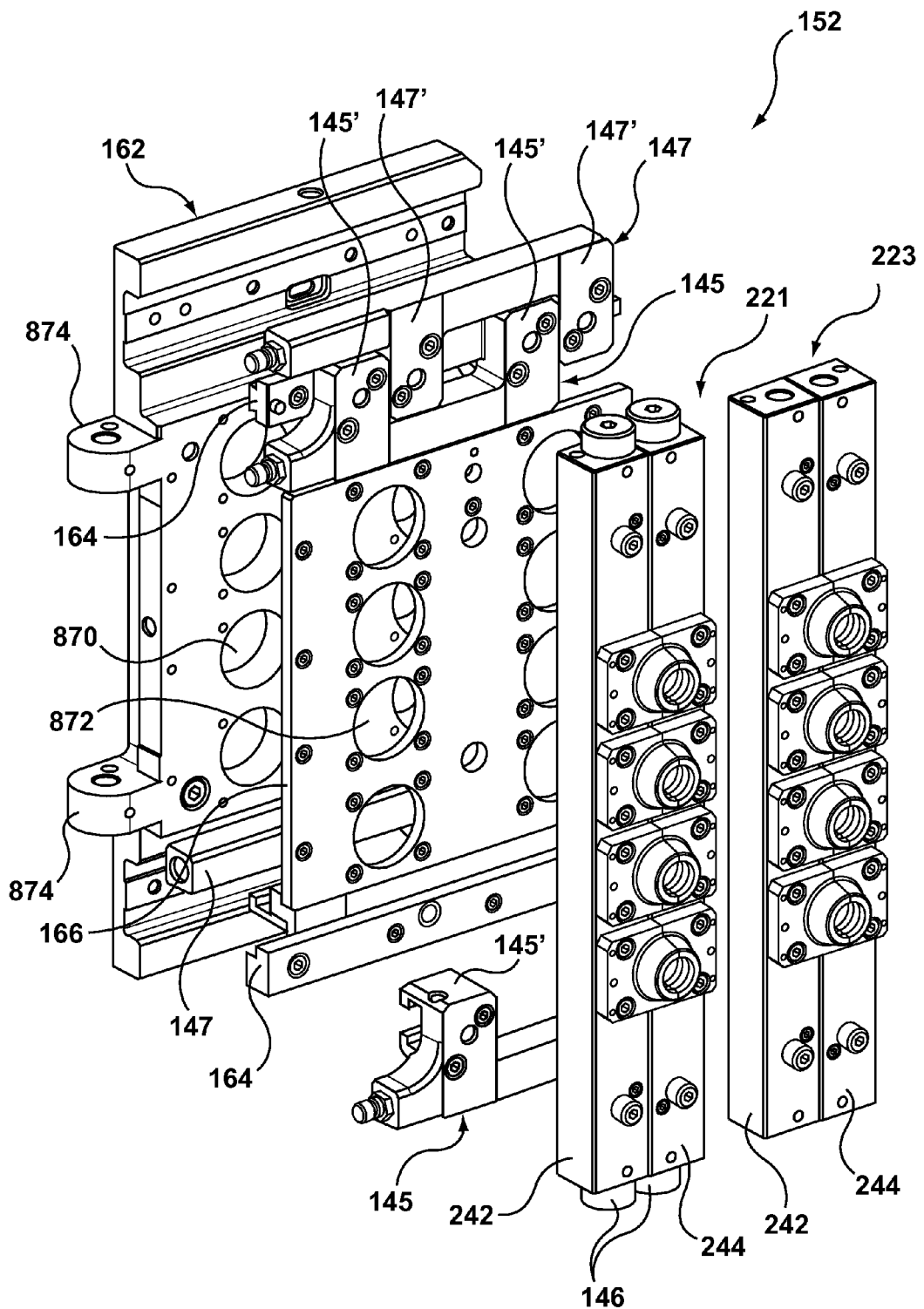
FIG. 8 is an exploded view of a stripper plate panel in accordance with an embodiment hereof removed from the stripper plate assembly shown in FIG. 5.

FIG. 8 is an exploded view of left stripper plate panel 152 in accordance with an embodiment hereof removed from stripper plate assembly 110 shown in FIGS. 5-7. Left stripper plate panel 152 includes a swing panel 162 having hinge portions 874 that align with and are attachable to corresponding hinged portions 776 of main stripper plate 150 so that left stripper plate panel 152 is swingably attached thereto. Swing panel 162 has upper and lower gibs 164 attached thereto on which are slidably disposed first and second connecting bars 145, 147. More particularly, gibs 162 have a T-shaped cross-section over which ride track portions 145', 147' of first and second connecting bars 145, 147. With reference to right stripper plate panel 154 shown in FIG. 6, which has the same construction as left stripper plate panel 152 with minor modifications so that right stripper plate panel 154 is hinged to swing open in the opposite direction from left stripper plate panel 152, swing panel 162 includes two rectangular openings 668 in a downstream surface thereof each of which leads to four circular openings 870 in an upstream surface thereof Rectangular openings 668 are sized to permit upper portions of core blocks 128 to be received therein when the stripper plate panels 152, 154 are in an operating position while circular openings 870 are sized to allow core supports 132 to pass therethrough when the stripper plate panels 152, 154 are in an operating position as well as when stripper plate assembly 110 is being translated by knock-out bars 106 during operation and installation of molding system 100. A wear plate 166 is positioned between swing panel 162 and split thread slide assemblies 221, 223 and similar to swing panel 162 includes eight circular openings 872 therethrough that align with circular openings 870 in swing panel 162 and are also sized to allow core supports 132 to pass therethrough when the stripper plate panels 152, 154 are in an operating position as well as when stripper plate assembly 110 is being translated by knock-out bars 106 during operation and installation of molding system 100. Split thread-slide assemblies 221, 223 attach at a top and bottom to first and second connecting bars 145, 147 such that left slides 242 are attached to respective track portions 145' and right slides 244 are attached to respective track portions 147' to thereby be connected to first and second connecting bars 145, 147 to move in tandem. Wear plate 166 is situated between swing panel 162 and split thread-slide assemblies 221, 223 to provide a durable reduced friction surface upon which slides 242, 244 may laterally slide during operation. In an embodiment, wear plate 166 may be made of brass to provide this function.

Figure 9:
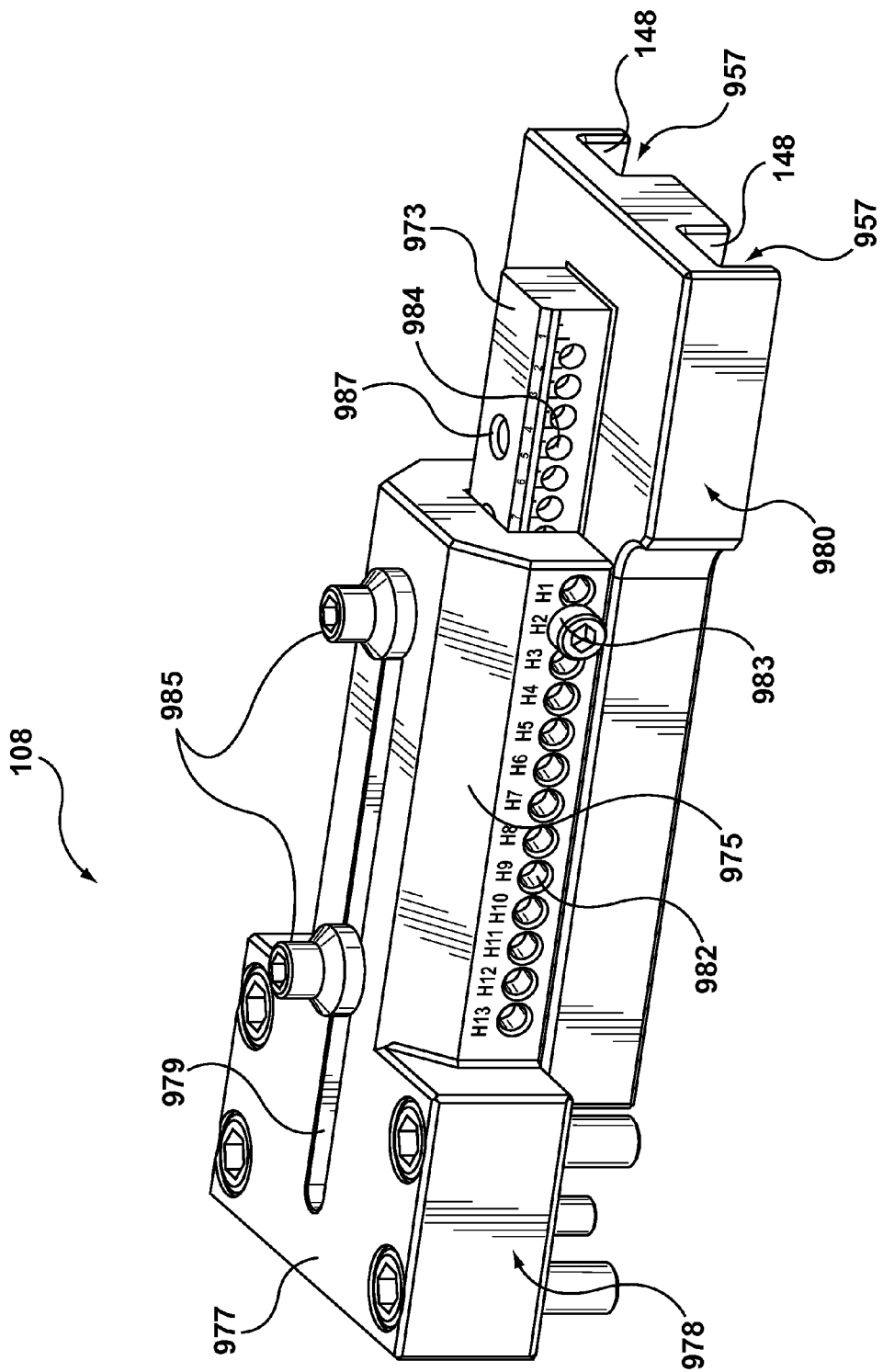
FIG. 9 is a perspective view of a cam adjustment assembly in accordance with an embodiment hereof removed from the molding system of FIG. 1.
Figure 9A:
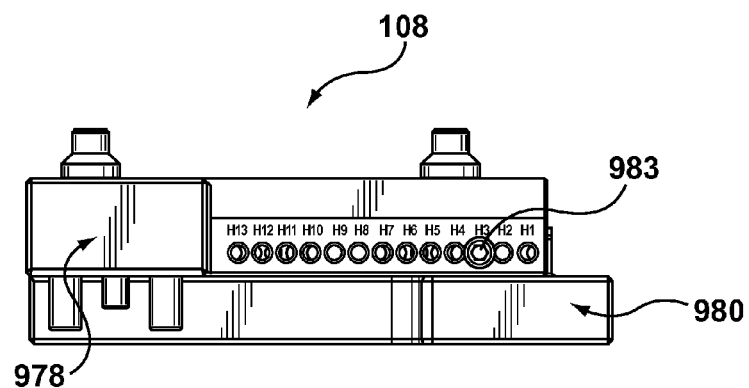
FIGS. 9A-9C depict side views of the cam adjustment assembly shown in FIG. 9 in various configurations for accommodating different length preforms.
Figure 9B:
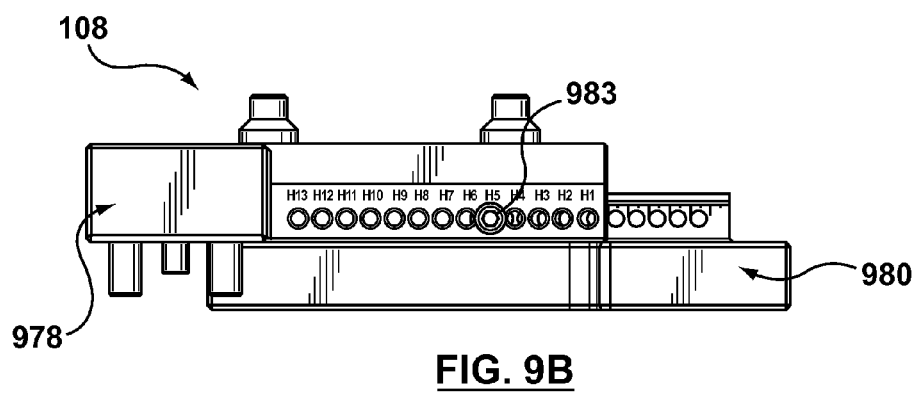
Figure 9C:
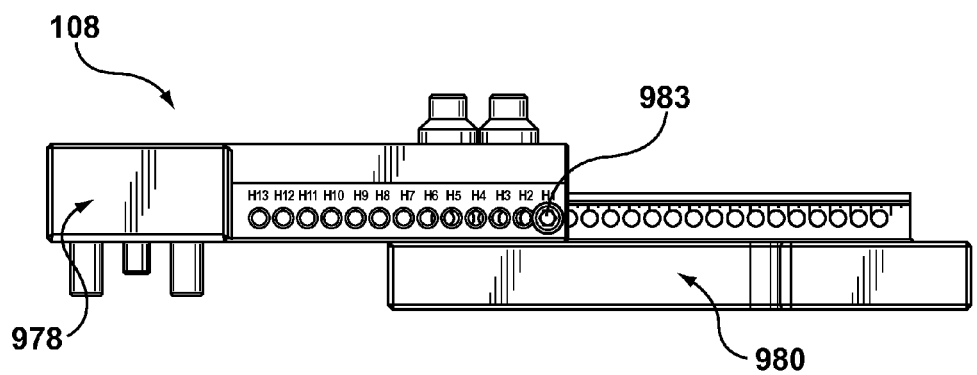

FIG. 9 is a perspective view of cam adjustment assembly 108 in accordance with an embodiment hereof removed from molding system 100 with FIGS. 9A-9C depicting side views of cam adjustment assembly 108 in various configurations for accommodating different length preforms that may be molded by molding system 100. As note above, mold core side 102 includes four cam adjustment assembly 108 attached thereto to provide bearing surfaces 148 within cam slots 957 for guiding and receiving respective cam followers 146 of split thread-slide assembly 221. Cam adjustment assembly 108 includes a housing 978 that slidably receives therein a cam component 980, which defines cam slots 957 with bearing surfaces 148. Housing 978 includes a base 977 that receives attachment means, such as bolts, therethrough for fixedly securing cam adjustment assembly 108 to core plate 107. Housing 978 also includes a cantilevered extension 975 that slidably receives a track 973 of cam component 980 therein. Each of cantilevered extension 975 of housing 978 and track 973 of cam component 980 includes a series of longitudinally-spaced openings or holes 982, 984 therethrough. By inserting a locking pin 983 within aligned openings 982, 984 of housing cantilevered extension 975 and cam component track 973, an overall length of cam adjustment assembly 108 may be selected to suit a particular length preform to be molded by molding system 100. The numerous combinations of openings between housing 978 and cam component 980 ensures adjustability of preform length in fine increments, such as approximately 1 mm. The selected overall length of cam adjustment assembly 108 may then be fixed by inserting two or more locking or clamping bolts 985 through slot 979 of housing 978 such that each is mated within one of the threaded bores 987 of cam component 980. In an embodiment, the choice of threaded bore 987 within which to mate locking bolt 985 is made to provide a maximum pitch or distance between locking bolts 985 in order to provide maximum rigidity to the joined housing 978 and cam component 980 structures. It would be understood by one of ordinary skill in the art that each cam adjustment assembly 108 attached to mold core side 102 would be set to the same overall length in order to accommodate the molding and ejection of a certain length preform.

As depicted in FIGS. 9A-9C various overall lengths of cam adjustment assembly 108 may be achieved depending on which particular openings 982, 984 are aligned to receive locking pin 983 therein. In embodiments hereof, an overall length of cam adjustment assembly 108 may be adjusted to accommodate molding preforms with lengths in a range of 55 mm to 180 mm. For example, cam adjustment assembly 108 may accommodate molding system 100 molding preforms 55 mm in length as configured in FIG. 9A, preforms 135 mm in length as configured in FIG. 9B and preforms 180 mm in length as configured in FIG. 9C.

A method of performing a quick-change of the molding components of molding system 100 will now be described. In a certain molding application, molding system 100 may be running and molding preforms of a size A when it is desired to change-over to begin molding preforms of a size B. Accordingly, molding system 100 is stopped and mold core side 102 and mold cavity side 104 are separated to open to maximum daylight while at the same time the hot runner system and cooling water remain at operating temperatures.

The flow of cooling water is stopped within molding system 100 and purged from cavity block assemblies 126, core block assemblies 130 and split thread-slide assemblies 221, 223. Stripper plate assembly 110 is then stroked forward of core plate 107 to at or near a maximum preform ejection distance along leader pins 160 and clamping devices 636 are pneumatically or hydraulically deactivated in order to allow left and right stripper plate panels 152, 154 to swing outwardly and clear of core inserts 122. When stripper plate assembly 110 is in such a forward position, cam followers 146 of split thread-slide assemblies 221 will exit respective cam slots 957 of cam adjustment assembly 108.

Each of cavity block assemblies 126, core block assemblies 130 and split thread-slide assemblies 221, 223 that together mold preforms of size A are then removed and replaced by cavity block assemblies 126, core block assemblies 130 and split thread-slide assemblies 221, 223 that together mold preforms of size B. More particularly with stripper plate assembly 110 preferably positioned as shown in FIG. 7 and stroked backwards to rest against core plate 107, cavity block assemblies 126 and core block assemblies 130 for molding a preform of size A are removed from manifold plate 127 and core plate 107, respectively, by hydraulically or pneumatically deactivating clamping devices 136. Cavity block assemblies 126 and core block assemblies 130 for molding a preform of size B are then installed into the deactivated clamping devices 136 and secured therein upon removal of the air or oil used to deactivate the clamping devices. In another embodiment, core block assemblies 130 for molding a preform of size A may be removed from core plate 107 while stripper plate assembly 110 is stroked forward of core plate 107 to at or near a maximum preform ejection distance and core block assemblies 130 for molding a preform of size B may then be installed with stripper plate assembly 110 in this forward position. Similarly with stripper plate assembly 110 preferably in an open position as shown in FIG. 6 and resting against core plate 107, split thread-slide assemblies 221, 223 used to mold preforms of size A are removed from respective left and right stripper plate panels 152, 154 by removal of the attachment means, such as bolts or screws, that were used to secure split thread-slide assemblies 221, 223 to first and second connecting bars 145, 147. Split thread-slide assemblies 221, 223 used to mold preforms of size B are then installed on respective left and right stripper plate panels 152, 154 by the attachment means, such as bolts or screws, that attach split thread-slide assemblies 221, 223 to first and second connecting bars 145, 147. Stripper plate assembly 110 is once again stroked forward of core plate 107 to at or near the maximum preform ejection distance along leader pins 160 and left and right stripper plate panels 152, 154 are inwardly swung or moved together and seated against main stripper plate 150 to be secured by clamping devices 636. Stripper plate assembly 110, which will now look as shown in FIG. 5, is then stroked backward against core plate 107.

While molding system 100 having the molding components installed for molding preforms of size B is in the mold open configuration with the stripper plate assembly 110 fully retracted, an overall length of each cam adjustment assembly 108 is adjusted to accommodate molding preforms of size B. The length adjustment may be made by loosening locking bolts 985 and loosening and removing locking pin 983 so that cam component 980 may be slid into or out of housing 978 until it is near the length new preform size B, which is aided by a millimeter scale on the side of cam component 980 that corresponds to the length cam component 980 must protrude from housing 978 to accommodate the length of the new preform size B. Locking pin 983 is inserted into a designated opening 982 in the side of housing cantilevered extension 975, which corresponds to the millimeter scale, while care is taken to ensure locking pin 983 also enters the corresponding opening 984 of cam component track 973. The overall length of cam adjustment assembly 108 is than fixed by tightening locking bolts 985. The flow of cooling water is subsequently introduced to molding system 100 and into the new set of cavity block assemblies 126, core block assemblies 130 and split thread-slide assemblies 221, 223 in order to begin molding preforms of size B with molding system 100.

Figure 10:
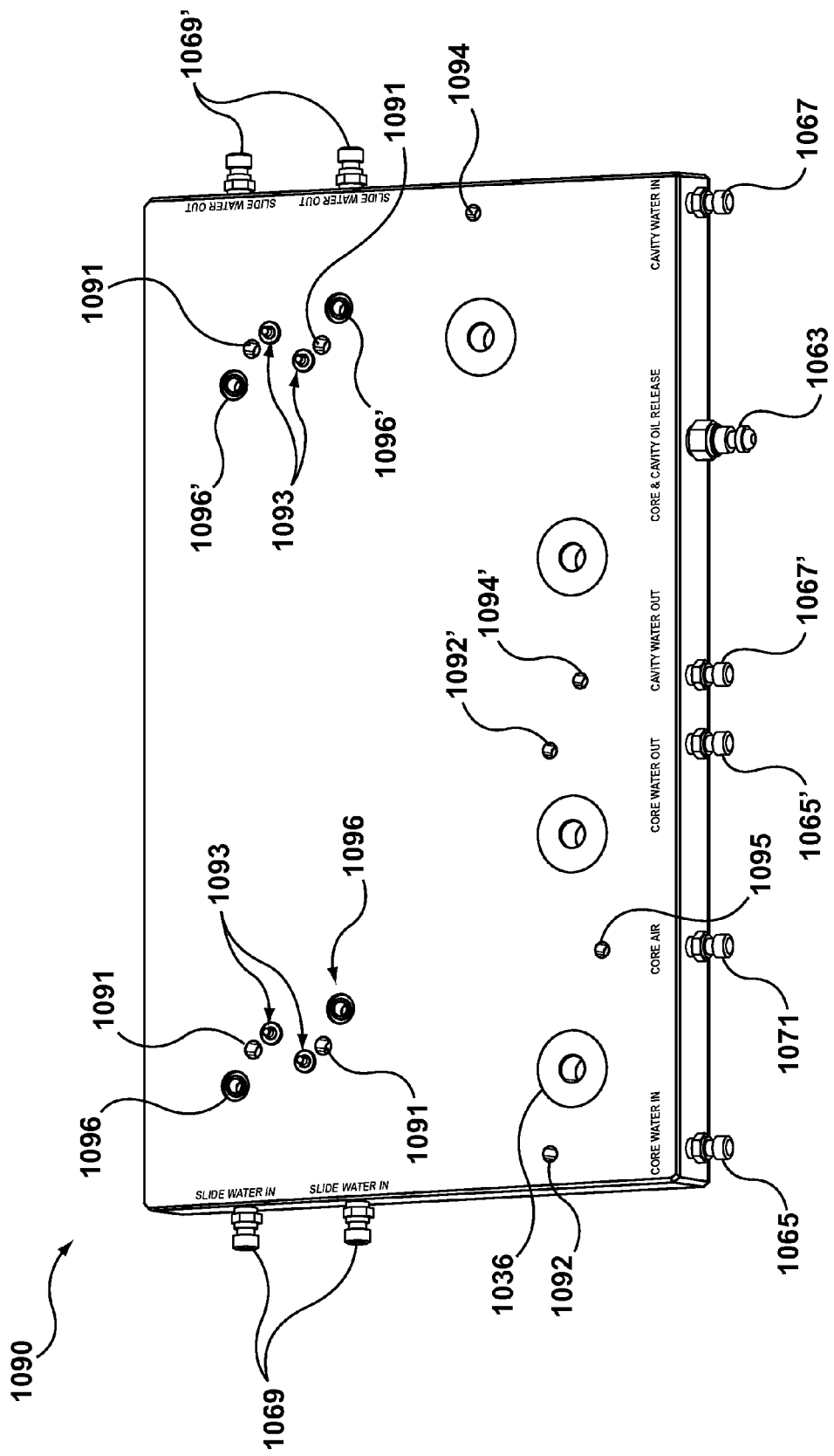
FIG. 10 is a perspective top view of a fixture plate tool in accordance with an embodiment hereof for use in assembling and testing the core block assembly, the cavity block assembly and the split thread-slide assemblies depicted in FIGS. 3A-3C and 4A-4C.
Figure 10A:
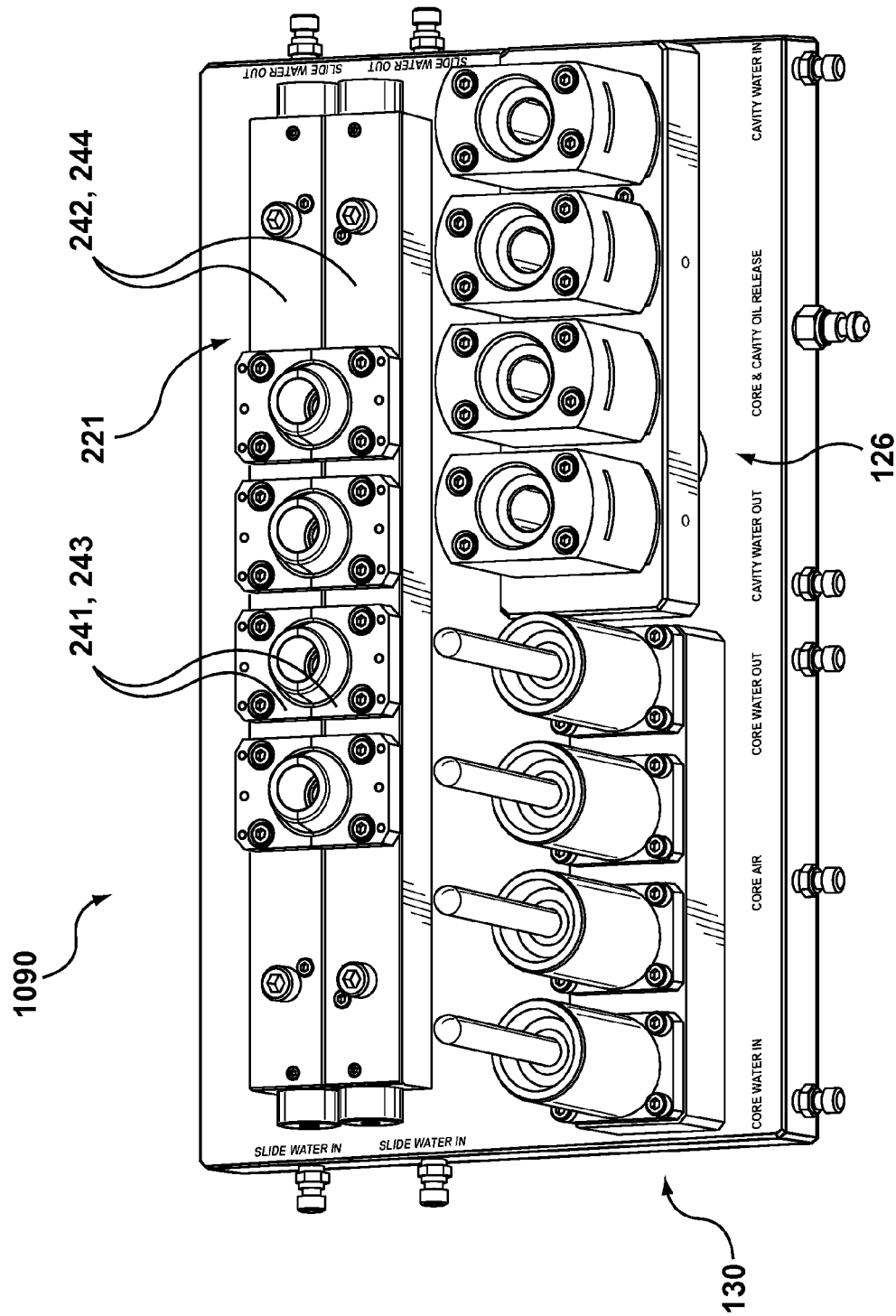
FIG. 10A is a perspective top view of the fixture plate tool of FIG. 10 with a core block assembly, a cavity block assembly and a split thread-slide assembly as depicted in FIGS. 3A-3C and 4A-4C attached thereto.

FIG. 10 is a perspective top view of a fixture plate tool 1090 in accordance with an embodiment hereof for use in assembling and testing core block assemblies 130, cavity block assemblies 126 and split thread-slide assemblies 221, 223 as depicted in FIGS. 3A-3C and 4A-4C, with FIG. 10A showing a core block assembly 130, a cavity block assembly 126 and a split thread-slide assembly 221 attached thereto. Fixture plate tool 1090 is a portable bench-top tool that facilitates assembly of core block assemblies 130, cavity block assemblies 126 and split thread-slide assemblies 221, 223 and allows for individual pressure testing of water and air circuits thereof as required. Fixture plate tool 1090 includes clamping devices 1036 for coupling with pull studs 134 of a corresponding mold core assembly 130 and mold cavity assembly 126, in a manner as described above with reference to clamping devices 136. Fixture plate tool 1090 includes an oil supply fitting 1063 for fluid communication with a supply of oil and internal passageways that are in fluid communication with each clamping device 1036 for providing oil to deactivate/release the clamping device during installation and removal of the respective mold core assembly 130 and/or mold cavity assembly 126 onto or from fixture plate tool 1090. Fixture plate tool 1090 also includes threaded bores 1091 for receiving bolts or other threaded fasteners to secure left and rights slides 242, 244 of split thread-slide assembly 221, 223 thereto.

When coupled to fixture plate tool 1090, cooling channels within mold core assembly 130, mold cavity assembly 126, and split thread-slide assembly 221, 223 are in fluid communication with core water ports 1092, 1092', cavity water ports 1094, 1094' and split thread-slide water ports 1096, 1096' respectively, for individual pressure testing of the water circuits thereof. Taper locks 1093 are also provided to extend upwards from fixture plate tool 1090 and engage recesses within respective left and rights slides 242, 244 to aid in mounting respective left and right split threads 241, 243 thereto. A core air port 1095 is also provided in fixture plate tool 1090 for fluidly communicating with air passageways in mold core assembly 130 for individual pressure testing of the air blows thereof.

Numerous fittings are shown extending from the sides of fixture plate tool 1090 for connecting to air, water and/or vacuum/sump sources. More particularly, core water inlet fitting 1065 for coupling with a water source is in fluid communication via an internal passageway with port 1092 in an upper surface of fixture plate tool 1090 and port 1092' is in fluid communication via an internal passageway with core water outlet fitting 1065' for coupling with a sump or vacuum source. Further, cavity water inlet fitting 1067 for coupling with a water source is in fluid communication via an internal passageway with port 1094 in the upper surface of fixture plate tool 1090 and port 1094' is in fluid communication via an internal passageway with cavity water outlet fitting 1067' for coupling with a sump or vacuum source. Additionally, slide water inlet fittings 1069 for coupling with a water source are in fluid communication via internal passageways with respective ports 1096 in the upper surface of fixture plate tool 1090 and ports 1096' are in fluid communication via internal passageways with respective slide water outlet fittings 1069' for coupling with a sump or vacuum source. Finally, air fitting 1071 for coupling with an air source is in fluid communication via an internal passageway with port 1095 in the upper surface of fixture plate tool 1090. The fittings are in fluid communication with internal passageways of fixture plate tool 1090 in order to provide air and water for the testing of the mounted mold components as noted above, as would be understood by one of ordinary skill in the art.

As note above, fixture plate tool 1090 may be used to hold a mold core assembly 130, a mold cavity assembly 126, and a split thread-slide assembly 221, 223 during assembly of the respective components thereof. This feature is of a particular benefit so that an operator may purchase many sets of cavity inserts 118, core inserts 122 and split thread components 120 to accommodate molding various length preforms, for instance, but need only purchase two sets of cavity blocks 124, core blocks 128 and slides 242, 244 in order to run the various length preform molds. By example, each time a stack change is desired to mold a different length preform, the cavity inserts 118, core inserts 122 and split thread components 120 needed to mold the different length preform may be mounted to the spare set of cavity blocks 124, core blocks 128 and slides 242, 244, respectively, while they are held by fixture plate tool 1090 in a stable and secure manner. The assemblies may then be tested as noted above. As such, fixture plate tool 1090 enables the replacement mold core assemblies 130, mold cavity assemblies 126, and split thread-slide assemblies 221, 223 to be ready for a quick change to the new molding arrangement prior to stopping production of the injection molding machine.

Figure 12:
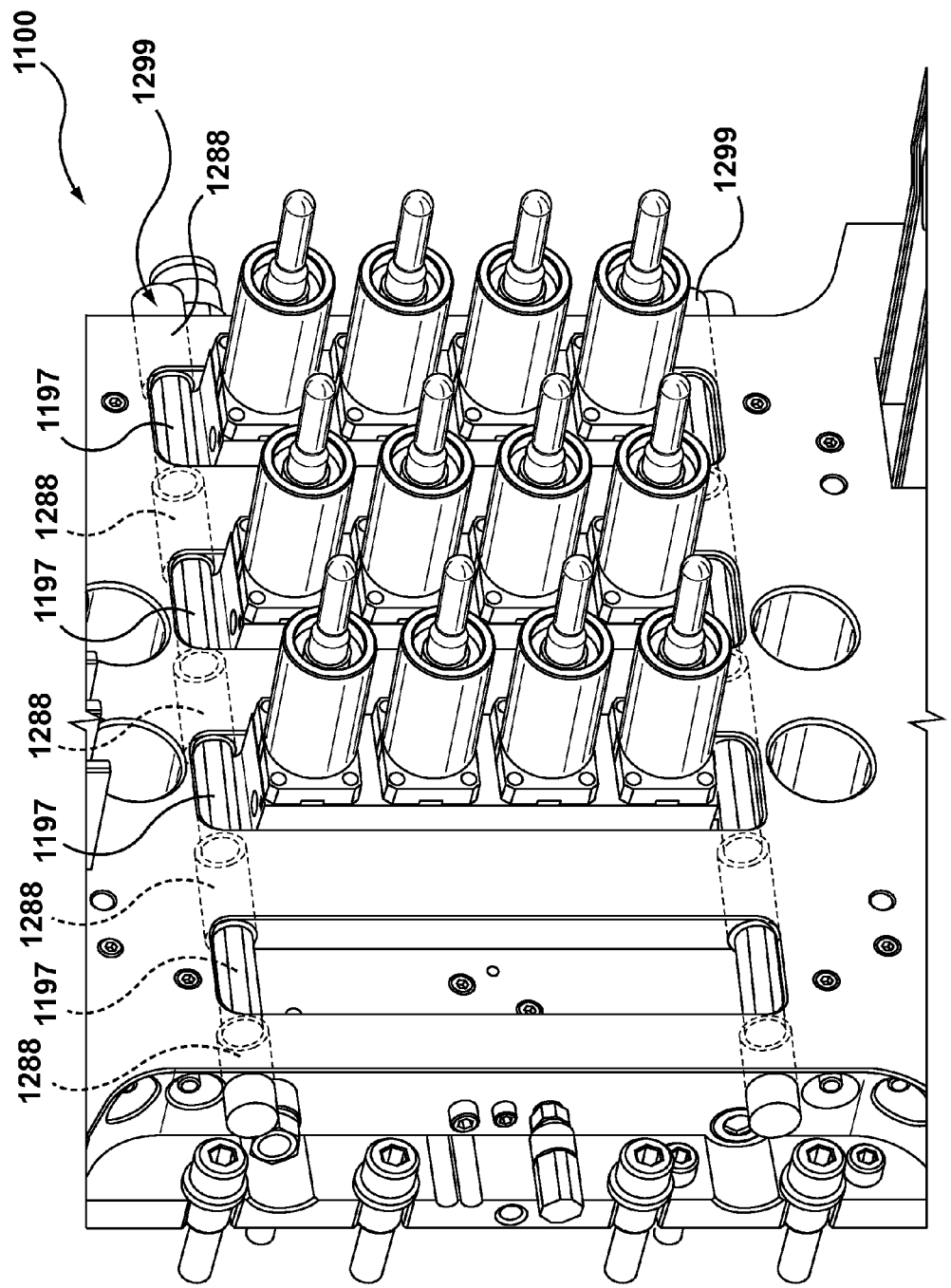
FIG. 12 is an internal schematic of the molding system of FIG. 11 illustrating a cam shaft in accordance with an embodiment hereof.

FIG. 11 is perspective view of a portion of a molding system 1100 that includes cam shaft locking assemblies 1198 in accordance with another embodiment hereof with FIG. 11A being a sectional view of molding system 1100 taken along line A-A of FIG. 11. FIG. 12 is an internal schematic of molding system of 1100 illustrating a full length of cam shafts 1299 of cam shaft locking assemblies 1198 in accordance with an embodiment hereof. Molding system 1100 includes substantially all features of molding system 100 discussed above except for clamping devices 136 that are used to secure cavity block assemblies 126 and core block assemblies 130 to manifold plate 127 and core plate 107, respectively. Instead molding system 1100 includes cam shaft locking assemblies 1198 to hold core block assemblies 1130 against core plate 1107 as well as to similarly hold the cavity block assemblies 1107 (not shown) against the manifold plate (not shown). Each cam shaft locking assembly 1198 includes a lever arm 1181 attached to an operator's side of cam shaft 1299 by which an operator may rotate cam shaft 1299 between a locked position as illustrated by the upper cam shaft locking assembly 1198 in FIGS. 11 and 11A and an unlocked position as illustrated by the lower cam shaft locking assembly 1198 shown in FIGS. 11 and 11A. Each lever arm 1181 may be rotated 45° to lock or release a respective series of core or cavity block assemblies via a respective cam shaft 1299. In order to maintain a locking force against a respective series of core or cavity block assemblies during operation of molding system 1100, lever arm 1181 is held down by a pivotable hold-down linkage 1186. More particularly as described with reference to the single core block assembly 1130 shown in FIG. 11, upper and lower clamping ledges or flange portions 1133 of core block 1128 are engaged by a cam portion 1197 of a respective upper or lower cam shaft 1299 when the respective cam shaft 1299 is rotated by lever arm 1181 into the position illustrated by the upper cam shaft locking assembly 1198 shown in FIGS. 11 and 11A. In a similar manner a cavity block of a cavity block assembly for use in molding system 1100 may be modified to include upper and lower clamping ledges or flange portions for engagement by cam portions of a respective cam shaft. As shown in FIG. 12, cam portions 1197 are spaced apart along cam shaft 1299 by cam shaft bushings 1288. Cam shaft bushings 1288 have a circular cross-section and are rotatable within corresponding bores in core plate 1107, or the manifold plate (not shown) with respect to a cavity block assembly, to fully support cam shaft 1299 along its length.

In the embodiment of FIGS. 11 and 11A, core block assembly 1130 is also shown additionally secured to core plate 1107 at two points between its upper and lower ends by optional screws 1189. Screws 1189 may be used to prevent bowing of core block assembly 1130 during mold opening and/or ejection of certain lengths of molded preforms. In another embodiment instead of screws 1189, clamping devices 136 may be used with cam shaft locking assemblies 1198 in a manner as described above.

Figure 12A:
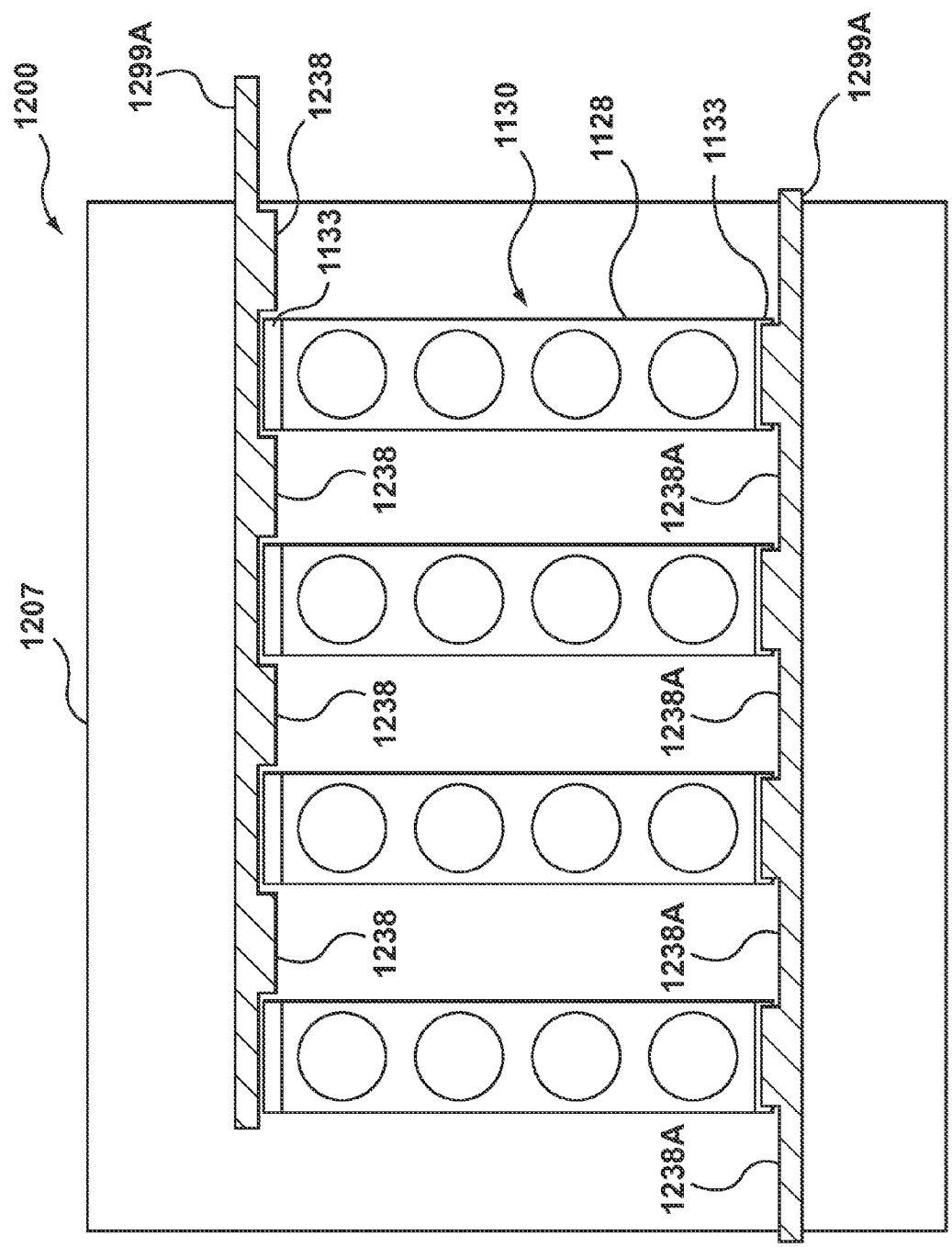
FIG. 12A is a schematic view of a portion of a quick change molding system that includes a slidable shaft latching assembly in accordance with another embodiment hereof.

In another embodiment instead of using clamping devices and cam shaft locking assemblies as described above, the cavity block assemblies and/or the core block assemblies may be secured to the manifold plate and the core plate, respectively, by a slidable shaft latching assembly 1299A, as shown in FIG. 12A. More particularly, FIG. 12A schematically depicts outlines of four core blocks 1128 of four core block assemblies 1130, which are shown in detail in FIGS. 11, 11A and 12, having upper and lower flange portions 1133 that are engageable by a respective latch portion 1238 of a respective slidable shaft latching assembly 1299A to form a locked position. Latch portions 1238 are spaced apart along a respective slidable shaft latching assembly 1299A by cut-out portions 1238A, which when aligned with upper and lower flange portions 1133 of a respective core block 1128 forms an unlocked position which permits the core block assembly 1130 to be removed from core plate 1207. In a similar manner a cavity block of a cavity block assembly for use in molding system 1200 may be modified to include upper and lower clamping ledges or flange portions for engagement by latch portions 1238 of respective slidable shaft latching assemblies 1299A. In another embodiment (not shown) instead of using clamping devices, cam shaft locking assemblies or a slidable shaft latching assemblies as described above, the cavity block assemblies and/or the core block assemblies may be secured to the manifold plate and the core plate, respectively, by suitably placed threaded attachment means, such as two or more screws, bolts or other threaded fasteners. In a further embodiment (also not shown) cavity block assemblies and/or the core block assemblies may be secured to the manifold plate and the core plate, respectively by one or more of the above described clamping mechanisms.

Figure 13A:
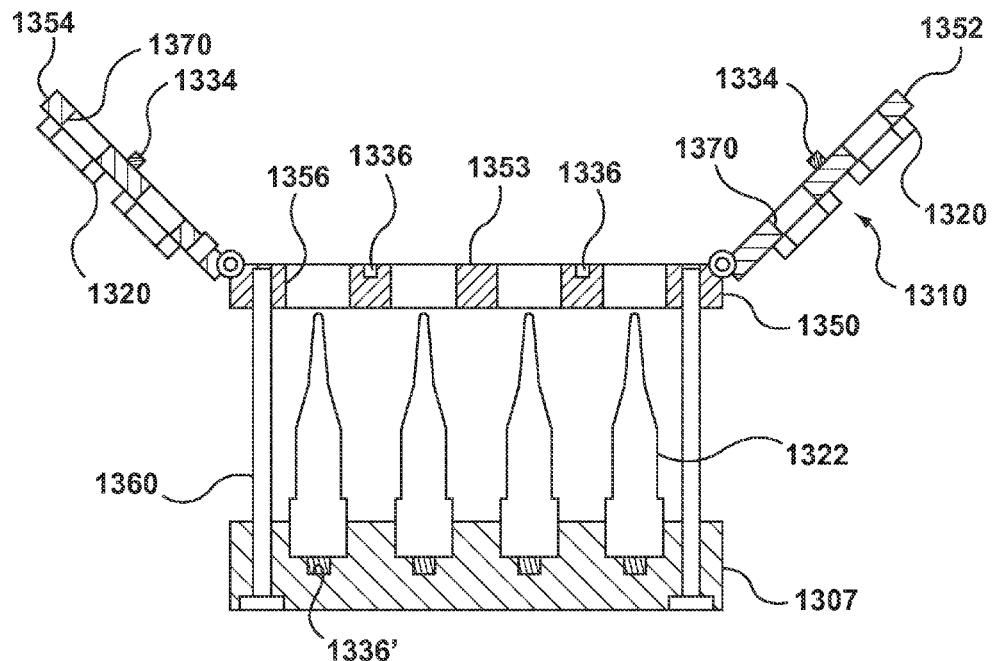
FIGS. 13A and 13B are top sectional views of the core side of a quick change molding system in accordance with another embodiment hereof illustrating a sequence for changing-out core inserts.
Figure 13B:
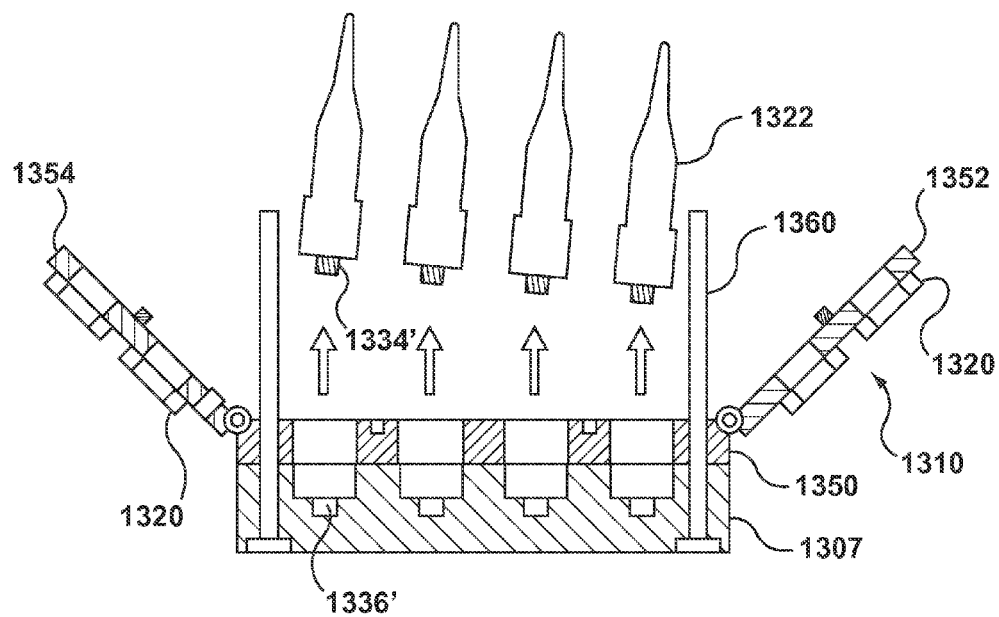

FIGS. 13A and 13B are top sectional views of the core side 1302 of a quick change molding system in accordance with another embodiment hereof illustrating a sequence for changing-out core inserts thereof, each of which is secured to a core plate 1307 as an individual core insert 1322. In an embodiment, each core insert 1322 includes a pull stud 1334' that is received by a respective clamping device 1336' within core plate 1307 in a manner as discussed above with reference to clamping devices 136. In another embodiment, (not shown) core inserts 1322 are secured to core plate 1307 by a threaded connection. In a further embodiment (also not shown) core inserts 1322 are secured to core plate 1307 by either of the cam shaft locking assembly or the slidable shaft latching assembly described above. Stripper plate assembly 1310 may be used in a molding operation that produces molded articles that require stripper ejection such as pipettes or the like, and is attachable to a movable platen and knock-out bars of an injection molding machine as would be understood by one of ordinary skill in the art. Stripper plate assembly 1310 includes a main stripper plate 1350 having left and right stripper plate panels 1352, 1354 hinged thereto to swing away from an upstream face 1353 of main stripper plate 1350 as shown in each of FIGS. 13A and 13B. Similar to the embodiment described with reference to FIG. 6, upstream face 1353 of main stripper plate 1350 includes a plurality of clamping devices 1336 positioned therein for mating with corresponding pull studs 1334 that extend from downstream faces of left and right stripper plate panels 1352, 1354. When left and right stripper plate panels 1352, 1354 are seated against main stripper plate 1350 in an operating position, clamping devices 1336 hold a respective pull stud 1334 therein in a manner as described above with reference to clamping device 136 to thereby prevent panels 1352, 1354 from opening during a molding operation. Main stripper plate 1350 has a downstream face 1351 that sits against core plate 1307 during the molding operation and in which upstream ends of knock-out bars (not shown) are secured.

Main stripper plate 1350 includes openings 1356 and left and right stripper plate panels 1352, 1354 together include a corresponding number of openings 1370 for receiving respective core inserts 1322 therethrough. Stripper rings 1320 are affixed to upstream surfaces of left and right stripper plate panels 1352, 1354 by threaded fasteners or cir-clips as would be known to one of ordinary skill in the art, with each stripper ring 1320 surrounding a respective panel opening 1370 such that a tapered inner surface of the stripper ring interfaces with a corresponding taper of a respective core insert 1322 in a mold closed position (not shown). In this manner, each stripper ring is sealingly aligned with a respective core insert 1322 during the molding operation as would be understood by one of ordinary skill in the art.

Guide or leader pins 1360 are attached to and forwardly extend from core plate 1307 to be slidably receivable within a respective guide bore and/or guide bushing of stripper plate assembly 1310. During ejection of the molded articles or installation of another set of core inserts 1322, knock-out bars (not shown) are operably connected to translate stripper plate assembly 1310 toward the parting line $P_L$ of the molding system along leader pins 1360. With reference to installation of another set of core inserts 1322, stripper plate assembly 1310 is stroked forward of core plate 1307 to at or near a maximum molded article ejection distance along leader pins 1360 and clamping devices 1336 are pneumatically or hydraulically deactivated in order to allow left and right stripper plate panels 1352, 1354 to swing or move outwardly and clear of core inserts 1322, as shown in FIG. 13A. With stripper plate assembly 1310 stroked backwards to rest against core plate 1307 as shown in FIG. 13B, core inserts 1322 are removed from core plate 1307. In an embodiment in which pull studs and clamping devices are utilized, removal of core inserts 1322 may be achieved by hydraulically or pneumatically deactivating clamping devices 1336'. In another embodiment, core inserts 1322 may be removed from core plate 1307 while stripper plate assembly 1310 is stroked forward of core plate 1307 to at or near a maximum ejection distance, as shown in FIG. 13A. Stripper rings 1320 may also be changed-out concurrent with the change-out of core inserts 1322.

FIG. 14 is a top sectional view of a quick-change molding system 1400 in accordance with another embodiment hereof in a mold closed configuration. Molding system 1400 includes a core side 1402, which includes core plate 1307, and core inserts 1322 as described in the preceding embodiment, that is securable to a movable platen of an injection molding machine (not shown). Core side 1402 also includes stripper plate assembly 1410 that is translatable along leader pins 1360 in a manner as described with reference to stripper plate assembly 1310. Stripper plate assembly 1410 includes a main stripper plate 1450 having stripper plate panels 1452, 1454. Stripper plate panels 1452, 1454 are moveably attached by way of a hinge to each other and also to main stripper plate 1450 to fold toward each other and swing away from an upstream face 1453 of main stripper plate 1450 in one direction in the manner of a bi-fold door, as shown in each of FIGS. 14B and 14C. Each of main stripper plate 1450, stripper plate panels 1452, 1454 and stripper rings 1320 have corresponding openings for receiving a respective core insert 1322 there through in a manner as similarly described with reference to the corresponding structures in the preceding embodiment.

A cavity side 1404 of molding system 1400 is securable to a stationary platen of the injection molding machine as discussed in an earlier embodiment and includes a melt inlet component 1412 extending through back plate 1409 for receiving a melt stream of moldable material from an injection nozzle (not shown) of the injection molding machine. The melt stream is conveyed within mold cavity side 1404 to a respective mold cavity 1414 via a hot runner manifold 1415 and a hot runner nozzle 1416. As is conventional, manifold 1415 and nozzles 1416 are positioned downstream of back plate 1409 within a manifold plate 1427. Each mold cavity 1414 is formed between respective molding surfaces of a cavity insert 1418 and core insert 1322 and is configured to producing a molded article that requires stripper ejection such as pipettes or the like. As similarly described with reference to core insert 1322 in the previous embodiment, each cavity portion is individually secured to manifold plate 1427 as an individual cavity insert 1418 using one of the coupling mechanisms described above such as the pull stud/gripper mechanisms. In an alternate embodiment (not shown), cavity inserts 1418 are secured the cavity side 1404 of the injection molding system 1400 by threaded connection. In a further embodiment (also not shown) cavity inserts 1418 are secured to the cavity side of the injection molding system 1400 by either of the cam shaft locking assembly or the slidable shaft latching assembly described above.

FIGS. 14A-14C illustrate molding system 1400 in a mold open configuration with core side 1402 and cavity side 1404 separated along a parting line of the mold and illustrate a sequence for changing-out core inserts 1322. With reference to installation of another set of core inserts 1322, stripper plate assembly 1410 is stroked forward of core plate 1307 to at or near a maximum molded article ejection distance along leader pins 1360. Clamping devices 1436 within main stripper plate 1450 are pneumatically or hydraulically deactivated in order to allow pull studs 1434 on stripper plate panels 1452, 1454 to be released and thereafter stripper plate panels 1452, 1454 are folded toward each other and swung outwardly to one side of core side 1402 to clear core inserts 1322, as shown in FIGS. 14B and 14C. With stripper plate assembly 1410 stroked backwards to rest against core plate 1307 as shown in FIG. 14C, clamping devices 1436' within core plate 1307 are pneumatically or hydraulically deactivated in order to allow pull studs 1434' on core inserts 1322 to be released and thereafter removed from core plate 1307. In FIG. 14C, stripper rings 1320 and cavity inserts 1418 are also shown being changed-out concurrent with the change-out of core inserts 1322.

Figure 15A:
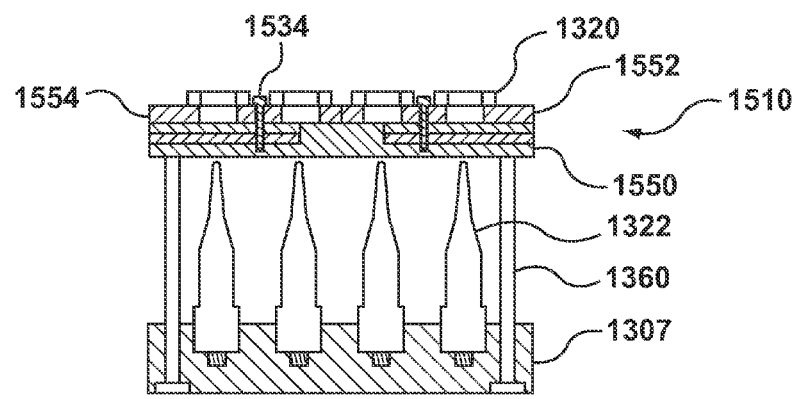
FIGS. 15A-15C are top sectional views of the core side of a quick change molding system in accordance with another embodiment hereof that illustrate a sequence for changing-out portions thereof.
Figure 15B:
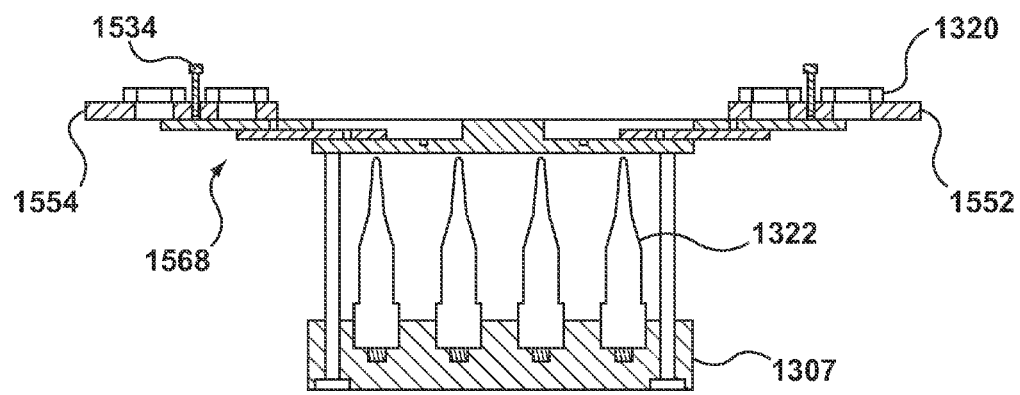
Figure 15C:
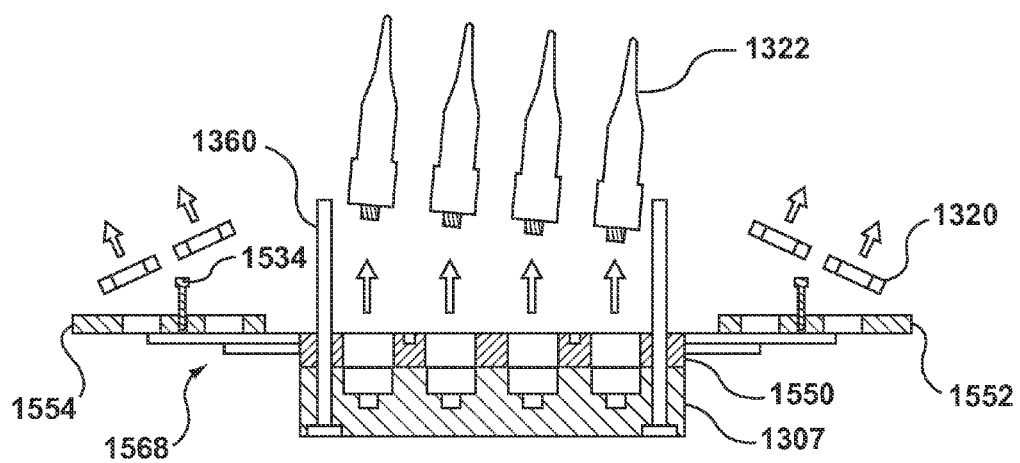

FIGS. 15A-15C are top sectional views of the core side of a quick change molding system in accordance with another embodiment hereof that illustrate a sequence for changing-out portions thereof. Stripper plate assembly 1510 is translatable along leader pins 1360 in a manner as described with reference to stripper plate assemblies of the preceding embodiments. Stripper plate assembly 1510 includes a main stripper plate 1550 having stripper plate panels 1552, 1554. Stripper plate panels 1552, 1554 are transversely slidable relative to main stripper plate 1550 along respective telescoping linear rails 1568 when latching devices 1534 are removed from their corresponding bores, as shown in each of FIGS. 15B and 15C. A suitable telescoping linear rail device for use in embodiments hereof is manufactured and sold by Rollon S.r.l. of Vimercate Italy. Briefly, each telescopic linear rail 1568 comprises two guide rails; one fixed rail attached to main stripper plate 1550 and one moveable rail attached to a stripper plate panel 1552, 1554, slidably coupled together by an intermediate element to allow for a full outward extension of stripper plate panel 1555, 1554 beyond main stripper plate 1550 during a core insert change-over, while telescoping together to remain within main stripper plate 1550 during normal molding operation. In an alternate embodiment, stripper plate panels 1552, 1554 are a single stripper plate panel that is transversely slidable along a single telescoping linear rail 1568 that projects from main stripper plate 1550 in only one direction.

Each of main stripper plate 1550, stripper plate panels 1552, 1554 and stripper rings 1320 have corresponding openings for receiving a respective core insert 1322 therethrough in a manner as similarly described with reference to the corresponding structures in the preceding embodiment.

With reference to installation of a new set of core inserts 1322, stripper plate assembly 1510 is stroked forward of core plate 1307 to at or near a maximum molded article ejection distance along leader pins 1360. Latching devices 1534 are removed their corresponding bores that extend between a respective stripper plate panel 1552, 1554 to main stripper plate 1550. Thereafter, stripper plate panels 1552, 1554 are slid outward and away from each other to clear core inserts 1322, as shown in FIGS. 15B and 15C. With stripper plate assembly 1510 stroked backwards to rest against core plate 1307 as shown in FIG. 15C, core inserts 1322 are removed from core plate 1307. In FIG. 15C, stripper rings 1320 are also shown being changed-out concurrent with the change-out of core inserts 1322.

Figure 16A:
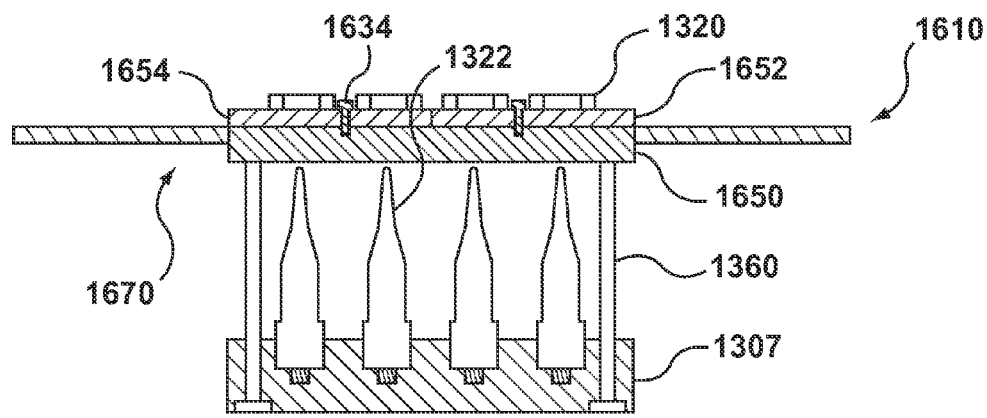
FIGS. 16A-16C are top sectional views of the core side of a quick change molding system in accordance with another embodiment hereof that illustrate a sequence for changing-out portions thereof.
Figure 16B:
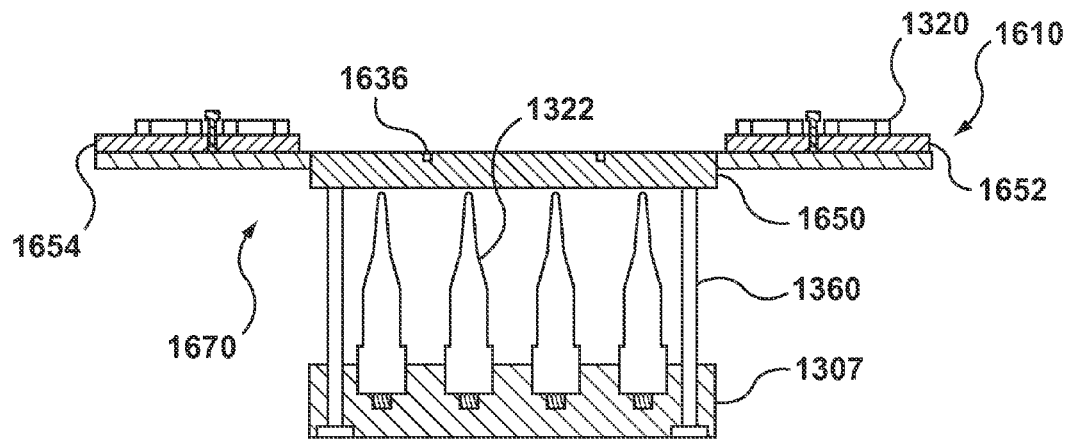
Figure 16C:
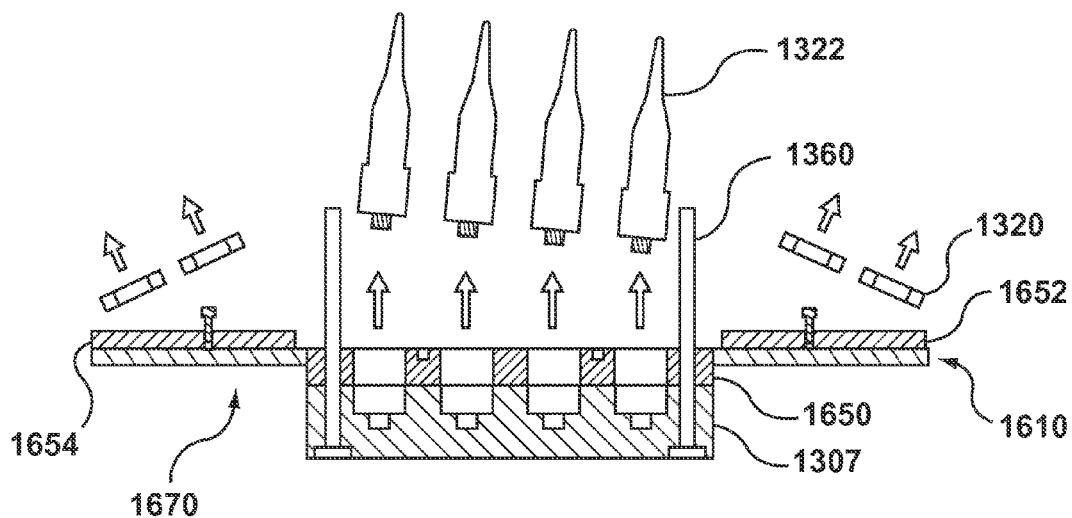

FIGS. 16A-16C are top sectional views of the core side of a quick change molding system in accordance with another embodiment hereof that illustrate a sequence for changing-out portions thereof. Stripper plate assembly 1610 is translatable along leader pins 1360 in a manner as described with reference to stripper plate assemblies of the preceding embodiments. Stripper plate assembly 1610 includes a main stripper plate 1650 having stripper plate panels 1652, 1654. Stripper plate panels 1652, 1654 are transversely slidable along a linear rail 1670 relative to main stripper plate 1650 when latching devices 1634 are removed from their corresponding bores 1636, as shown in each of FIGS. 16B and 16C. In an alternate embodiment, stripper plate panels 1652, 1654 are a single stripper plate panel that is transversely slidable along a single rail 1670 that projects from main stripper plate 1550 in only one direction.

A suitable linear rail device for use in embodiments hereof is manufactured and sold by Rollon S.r.l. of Vimercate Italy. Briefly, each linear rail 1670 comprises a guide rail attached to and projecting from main stripper plate 1550 and a slider coupled to a stripper plate panel 1552, 1554, slidably coupled to the guide rail to allow for a full outward extension of stripper plate panel 1555, 1554 beyond main stripper plate 1550 during a core insert change-over.

Each of main stripper plate 1650, stripper plate panels 1652, 1654 and stripper rings 1320 have corresponding openings for receiving a respective core inserts 1322 there through in a manner as similarly described with reference to the corresponding structures in the preceding embodiment.

With reference to installation of a new set of core inserts 1322, stripper plate assembly 1610 is stroked forward of core plate 1307 to at or near a maximum molded article ejection distance along leader pins 1360. Latching devices 1634 are pulled free of their corresponding bores 1636 that extend through a respective stripper plate panel 1652, 1654 to main stripper plate 1650. Thereafter stripper plate panels 1652, 1654 are slid outward and away from each other on linear rail 1670 to clear core inserts 1322, as shown in FIGS. 16B and 16C. With stripper plate assembly 1610 stroked backwards to rest against core plate 1307 as shown in FIG. 16C, core inserts 1322 are removed from core plate 1307. In FIG. 16C, stripper rings 1320 are also shown being changed-out concurrent with the change-out of core inserts 1322.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:
1. An injection molding system comprising:
 a mold insert set, wherein each mold insert of the mold insert set defines at least a portion of a mold cavity; and
 a shaft locking assembly that releasably attaches the mold insert set to a mold plate of the injection molding system, wherein the shaft locking assembly is displaceable between a locked position in which the mold insert set is held to the mold plate and an unlocked position in which the mold insert set is removable from the mold plate, wherein the mold insert set is attached to a respective mold insert block that is releasably attached to the mold plate by the shaft locking assembly.

2. The injection molding system of claim 1, wherein the shaft locking assembly includes a cam shaft rotatable relative to the mold plate.

3. The injection molding system of claim 2, wherein the cam shaft includes a cam portion that engages the mold insert set when the shaft locking assembly is in the locked position, and one or more bushing portions supporting the cam shaft along its length.

4. The injection molding system of claim 2, wherein the shaft locking assembly further includes a lever arm attached to the cam shaft by which an operator may rotate the cam shaft between the locked position and the unlocked position.

5. The injection molding system of claim 2, wherein the shaft locking assembly further includes a hold-down for maintaining a locking force against the mold insert set when the shaft locking assembly is in the locked position.

6. The injection molding system of claim 1, wherein the shaft locking assembly includes a shaft slidable relative to the mold plate.

7. The injection molding system of claim 6, wherein the slidable shaft includes a latch portion that engages the mold insert set when the shaft locking assembly is in the locked position, and a cut-out portion that aligns with the mold insert set when the shaft locking assembly is in the unlocked position.

8. The injection molding system according to claim 1, wherein the mold insert set is a set of cavity inserts and the mold plate is on a cavity side of the injection molding system.

9. The injection molding system according to claim 1, wherein the mold insert set is a set of core inserts and the mold plate is on a core side of the injection molding system.

10. The injection molding system according to claim 1, wherein the mold insert block includes a ledge for engaging with the shaft locking assembly.

11. The injection molding system according to claim 1, wherein the shaft locking assembly releasably attaches a plurality of mold insert sets to the mold plate of the injection molding system such that when the shaft locking assembly is in the locked position the plurality of mold insert sets are held to the mold plate and when the shaft locking assembly is in the unlocked position the plurality of mold insert sets are removable from the mold plate.

12. The injection molding system according to claim 11, wherein the shaft locking assembly includes a cam shaft having a plurality of cam portions, wherein each cam portion engages one of the plurality of mold insert sets when the shaft locking assembly is in the locked position, and one or more bushing portions supporting the cam shaft along its length.

13. An injection molding system comprising:
a mold plate; and
a shaft locking assembly for releasably attaching a plurality of mold insert sets to the mold plate, wherein the shaft locking assembly includes a plurality of locking portions and is displaceable between a locked position in which each locking portion holds a respective mold insert set of the plurality of mold insert sets to the mold plate, and an unlocked position in which each locking portion is positioned such that the plurality of mold insert sets are removable from the mold plate, and
wherein the shaft locking assembly includes a cam shaft rotatable relative to the mold plate and the plurality of locking portions are a plurality of cam portions of the cam shaft, wherein each cam portion is for engaging a respective mold insert set of the plurality of mold insert sets when the shaft locking assembly is in the locked position.

14. The injection molding system of claim 13, wherein the cam shaft includes one or more bushing portions supporting the cam shaft along its length.

15. The injection molding system of claim 13, wherein the shaft locking assembly further includes a lever arm attached to the cam shaft by which an operator may rotate the cam shaft between the locked position and the unlocked position.

16. The injection molding system of claim 13, wherein the shaft locking assembly further includes a hold-down for maintaining a locking force against the plurality of mold insert sets when the shaft locking assembly is in the locked position.

17. An injection molding system comprising:
a mold plate; and
a shaft locking assembly for releasably attaching a plurality of mold insert sets to the mold plate, wherein the shaft locking assembly includes a plurality of locking portions and is displaceable between a locked position in which each locking portion holds a respective mold insert set of the plurality of mold insert sets to the mold plate, and an unlocked position in which each locking portion is positioned such that the plurality of mold insert sets are removable from the mold plate, wherein the shaft locking assembly includes a shaft slidable along its length relative to the mold plate.

18. The injection molding system of claim 17, wherein the plurality of locking portions are a plurality of latch portions of the slidable shaft, wherein each of the latch portions is for engaging a respective mold insert set of the plurality of mold insert sets when the shaft locking assembly is in the locked position.

19. The injection molding system of claim 18, wherein the slidable shaft includes a plurality of cut-out portions, wherein each cut-out portion is for aligning with a respective mold insert set of the plurality of mold insert sets when the shaft locking assembly is in the unlocked position.

* * * * *